US006600540B2

(12) United States Patent
Yamakita et al.

(10) Patent No.: US 6,600,540 B2
(45) Date of Patent: Jul. 29, 2003

(54) LIQUID CRYSTAL DISPLAY

(75) Inventors: Hiroyuki Yamakita, Osaka (JP);
Akinori Shiota, Osaka (JP); Kenji Nakao, Osaka (JP); Daiichi Suzuki, Osaka (JP); Masanori Kimura, Osaka (JP); Yoshinori Tanaka, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/160,255

(22) Filed: Jun. 4, 2002

(65) Prior Publication Data

US 2002/0145579 A1 Oct. 10, 2002

Related U.S. Application Data

(63) Continuation of application No. 10/055,013, filed on Jan. 25, 2002.

(30) Foreign Application Priority Data

| Jan. 25, 2001 | (JP) | ................................. 2001-16649 |
| Mar. 30, 2001 | (JP) | ................................. 2001-98661 |
| Mar. 30, 2001 | (JP) | ................................. 2001-98689 |
| Jul. 25, 2001 | (JP) | ................................. 2001-224154 |

(51) Int. Cl.$^7$ ........................................ G02F 1/1343
(52) U.S. Cl. ..................... 349/139; 349/39; 349/177; 345/87
(58) Field of Search ..................... 349/38, 39, 128, 349/129, 130, 143, 144, 146, 172, 173, 174, 141; 345/87, 214

(56) References Cited

U.S. PATENT DOCUMENTS

| 6,069,620 | A | * | 5/2000 | Nakamura et al. ........... 345/214 |
| 6,256,082 | B1 | * | 7/2001 | Suzuki et al. ................ 349/144 |
| 6,396,469 | B1 | * | 5/2002 | Miwa et al. .................... 345/87 |
| 6,515,725 | B1 | * | 2/2003 | Hattori et al. ................ 349/123 |
| 6,522,379 | B1 | * | 2/2003 | Ishihara et al. .............. 349/139 |
| 6,542,211 | B1 | * | 4/2003 | Okada et al. ................. 349/130 |

FOREIGN PATENT DOCUMENTS

| JP | 09185032 A | * | 7/1997 | ........... G02F/1/133 |
| JP | 10-020284 | | 1/1998 | |
| JP | 11-295739 | | 10/1999 | |
| JP | 2000-066208 | | 3/2000 | |
| JP | 2000-314890 | | 11/2000 | |
| JP | 2000-321588 | | 11/2000 | |
| JP | 2001-083552 | | 3/2001 | |
| WO | WO00/14597 | | 3/2000 | |

OTHER PUBLICATIONS

Sueoka et al., "Initialization of Optically Compensated Bend–Mode LCDs", AM–LCD 1996, pp. 133–136.*
Kuo et al., "Improvement of Gray–Scale Performance of Optically Compensated Birefringence (OCB) Display Mode for AMLCDs", SID Digest 1994, pp. 927–930.*

* cited by examiner

*Primary Examiner*—Kenneth Parker
*Assistant Examiner*—David Chung
(74) *Attorney, Agent, or Firm*—McDermott, Will & Emery

(57) ABSTRACT

Disclosed is a liquid crystal display comprising: a pair of opposed substrates; a liquid crystal layer disposed between the pair of substrates, the liquid crystal layer having a display alignment state and a non-display alignment state which differ from each other and being subjected to an initialization process so as to be changed from the non-display alignment state to the display alignment state before an image is displayed; storage capacitor electrodes provided on one of the pair of substrates; pixel electrodes provided so as to overlap with the storage capacitor electrodes with an insulator interposed therebetween and disposed between the storage capacitor electrode and the liquid crystal layer, the pixel electrode having a lack portion in a region overlapping with the storage capacitor electrode; and drive means for generating potential difference between the storage capacitor electrode and the pixel electrode to thereby perform the initialization process.

22 Claims, 37 Drawing Sheets

INITIALIZATION PROCESS

INITIALIZATION PROCESS

INITIALIZATION PROCESS

LIQUID CRYSTAL DISPLAY

RELATED APPLICATIONS

The instant application is a continuation of U.S. patent application Ser. No. 10/055,013 filed on Jan. 25, 2002.

FIELD OF THE INVENTION

The present invention relates to a liquid crystal display, and more particularly to a liquid crystal display comprising an OCB-mode (Optically Self-Compensated Birefringence mode) liquid crystal display panel.

BACKGROUND OF THE INVENTION

In recent years, with advance in multimedia technologies, a great deal of image information has been distributed. As a means for displaying such image information, liquid crystal displays have rapidly spread. This is because liquid crystal displays with high contrast and wide viewing angle have been developed and put to practical use with development of liquid crystal technologies. At present, the liquid crystal displays are equal to CRT (Cathode Ray Tube) displays in display performance.

However, current liquid crystal displays are not suitable for use in display of moving images because of a low response speed of liquid crystal. While it is required that the liquid crystal respond within one frame period (16.7 msec) in a current NTSC (National Television Standard Committee) system, the current liquid crystal displays require more than 100 msec to respond between gray scales in multiple gray scale display, thereby causing a displayed moving image to be blurred. In particular, since the response between gray scales in a region where a drive voltage is low is extremely slow, a satisfactory moving image display is not attained.

Accordingly, many attempts have been conventionally made to provide high-speed responsive liquid crystal displays. While various liquid crystal display methods of high-speed response have been summarized by Wu et al. (C. S. Wu and S. T. Wu, SPIE, 1665, 250 (1992)), methods capable of achieving a response characteristic necessary for displaying the moving image are limited.

Currently, liquid crystal displays comprising an OCB-mode liquid crystal display panel, a ferroelectric liquid crystal display panel, or an anti-ferroelectric liquid crystal display panel are believed to be promising as liquid crystal displays having high-speed responsiveness suitable for display of the moving image.

Among these liquid crystal display panels, the ferroelectric liquid crystal display panel and the anti-ferroelectric liquid crystal display panel having a layered structure suffer from many problems associated with their practical uses such as: low shock resistance, limited range of available temperatures, and high temperature dependency of property. In view of these, attention has been focused on the OCB-mode liquid crystal display panels using nematic liquid crystal as liquid crystal displays suitable for display of the moving image.

The high-speed responsiveness of the OCB-mode liquid crystal displays was demonstrated by J. P. Bos in 1983. Since it was thereafter demonstrated that the provision of retardation films brought about displays with wide viewing angle and high-speed responsiveness, the OCB-mode liquid crystal display panels have been studied and developed.

FIG. 36 is a cross-sectional view schematically showing a constitution of the conventional OCB-mode liquid crystal display panel. Referring to FIG. 36, the OCB-mode liquid crystal display panel comprises a first glass substrate 81 provided with a transparent counter electrode 82 on a lower surface thereof and a second glass substrate 88 provided with a transparent pixel electrode 87 on an upper surface thereof. A first alignment layer 83 is formed on a lower surface of a counter electrode 82 and a second alignment layer 86 is formed on an upper surface of the pixel electrode 87. Liquid crystal molecules have been filled into a gap between these alignment layers 83, 86 to be formed into a liquid crystal layer 84. The alignment layers 83, 86 have been subjected to alignment treatment to align the liquid crystal molecules in parallel with one another and in the same direction. The thickness of the liquid crystal layer 84 is defined by a spacer 85.

A first polarizer 91 is provided on an upper surface of the first glass substrate 81 and a second polarizer 92 is provided on a lower surface of the second glass substrate 88. These polarizers 91, 92 are provided in cross nicole, that is, such that their optical axes are orthogonal to each other. A first retardation film 89 is provided between the first polarizer 91 and the first glass substrate 81 and a second retardation film 90 is provided between the second polarizer 92 and the second glass substrate 88. As the retardation films 89, 90, negative retardation films whose main axes are hybrid-arranged are used.

In the OCB-mode liquid crystal display panel so constituted, by application of a voltage, the liquid crystal is caused to transition from spray alignment 84a to bend alignment 84b, in which state, an image is displayed. Since the response speed of the liquid crystal of the OCB-mode liquid crystal display panel is significantly improved a compared to a TN-mode(Twisted nematic mode) liquid crystal display panel, the liquid crystal display panel suitable for moving image display is realized. In addition, the provision of the retardation films 89, 90 can achieve wide viewing angle.

As described above, the OCB-mode liquid crystal display panel displays an image when the liquid crystal is in the bend alignment state. Therefore, an initialization process for transitioning from initial spray alignment to bend alignment (hereinafter simply referred to as spray-bend alignment transition) is essential.

FIGS. 37A–37C are views for explaining the initialization process for performing the spray-bend transition in the conventional liquid crystal display, wherein FIG. 37A is a graph showing change in the rate of the spray-bend transition, and FIGS. 37B, 37C are graphs each showing a waveform of a voltage applied to the liquid crystal display panel in the initialization process.

In FIG. 37A, a longitudinal axis indicates the rate of transition from initial spray alignment to bend alignment in the liquid crystal layer included in the liquid crystal display panel. In FIGS. 37B, 37C, longitudinal axes respectively indicate potential difference between the source line and the counter electrode and potential difference between the gate line and the source line.

As shown in FIG. 37B, in the initialization process, a predetermined voltage is applied intermittently to the source line and the counter electrode so that the potential difference between the source line and the counter electrode becomes 10 V or more. Also, as shown in FIG. 37C, a predetermined voltage is applied to the gate line and the source line so that the potential difference between the gate line and the source line becomes 10 V or more over the whole initialization process. As a result, as shown in FIG. 37A, the rate of transition to the bend alignment is increased stepwise and the spray-bend transition is completed when the initialization process is terminated.

By the way, how the spray-bend transition takes place is observed and the observation result shows that a nucleus of the bend alignment is generated from a specific spot and grown. Hereinbelow, this nucleus is named "transition nucleus".

Publication of Examined Patent Application No. Hei. 10-20284 discloses a liquid crystal display panel in which a convex/concave portion made of a conductive material is formed at a predetermined position on the side of an array substrate for the purpose of generating the transition nucleus. In this constitution, since the electric field strength applied to a region of the liquid crystal layer on the convex/concave portion becomes larger than that around the region, the generation of the transition nucleus is facilitated. Consequently, the spray-bend transition smoothly takes place.

However, in the conventional liquid crystal display, the spray-bend transition sometimes takes place with low reliability because of insufficient strength of the electric field. In this case, the spray-aligned region is locally left and becomes a luminescent spot, which is observed as dot defect.

SUMMARY OF THE INVENTION

The present invention is directed to solving the above-described problem and an object thereof is to provide a liquid crystal display capable of reliably performing spray-bend transition.

To solve the above-described problem there is provided a liquid crystal display comprising: a pair of opposed substrates; a liquid crystal layer disposed between the pair of substrates, the liquid crystal layer having a display alignment state and a non-display alignment state which differ from each other and being subjected to an initialization process so as to be changed from the non-display alignment state to the display alignment state, before an image is displayed; a first electrode provided on one of the pair of substrates; a second electrode provided so as to overlap with the first electrode with an insulator interposed there between and disposed between the first electrode and the liquid crystal layer, the second electrode having a lack portion in a region overlapping with the first electrode; and drive means for generating potential difference between the first electrode and the second electrode to thereby perform the initialization process.

In this constitution, when the potential difference is generated between the first electrode and the second electrode, the electric field strength around the lack portion included in the second electrode is larger than the electric field strength in the other region. As a result, the liquid crystal molecules around the lack portion become the transition nucleus and transition of the alignment state of the liquid crystal layer reliably takes place.

In the liquid crystal display, one of the pair of substrates may be an array substrate having a plurality of pixel electrodes provided in matrix; a plurality of gate lines and source lines arranged so as to cross each other; a plurality of switching devices provided as corresponding to the respective pixel electrodes, for switching between a conductive state and a non-conductive state between the pixel electrodes and the source lines in accordance with a drive signal supplied through the gate lines, and the other of the pair of substrates may be an opposing substrate having a counter electrode opposed to the array substrate.

The liquid crystal display may further comprise storage capacitor electrodes overlapping with the pixel electrodes, and the first electrode may be the storage capacitor electrode and the second electrode may be the pixel electrode.

In the liquid crystal display, the first electrode may be the gate line and the second electrode may be the pixel electrode.

The liquid crystal display, may further comprise storage capacitor electrodes overlapping with the pixel electrodes, and the first electrode may be the storage capacitor electrode and the second electrode may be the source line.

In the liquid crystal display, the first electrode may be the gate line and the second electrode may be the source line.

In the liquid crystal display, the first electrode may be the pixel electrode and the second electrode may be the gate line.

The liquid crystal display, may further comprise storage capacitor electrodes overlapping with the pixel electrodes, and the first electrode may be the pixel electrode and the second electrode may be the storage capacitor electrode.

In the liquid crystal display, the first electrode may be the source line and the second electrode may be the gate line.

The liquid crystal display, may further comprise storage capacitor electrodes overlapping with the pixel electrodes, and the first electrode may be the source line and the second electrode may be the storage capacitor electrode.

The liquid crystal display, may further comprise: a third electrode and a fourth electrode provided on one of the pair of substrates on which the first and second electrodes are not provided, so as to overlap each other with an insulator interposed therebetween, the third electrode may be disposed between the fourth electrode and the liquid crystal layer and has a lack portion in a region overlapping with the fourth electrode, and the drive means may be adapted to generate the potential difference between the third electrode and the fourth electrode to perform the initialization process.

In this constitution, when the potential difference is generated between the third electrode and the fourth electrode to perform transition of the alignment state of the liquid crystal layer, the electric field strength around the lack portion included in the third electrode is larger than the electric field strength in the other region. As a result, the liquid crystal molecules around the lack portion of the third electrode as well as the liquid crystal molecules around the lack portion of the second electrode, become transition nucleuses. By thus generating the transition nucleuses on the sides of both substrates, the transition of the alignment state of the liquid crystal layer can take place more reliably.

In the liquid crystal display, the lack portion may be an aperture provided in the second electrode.

In this case, the aperture may include a plurality of straight-line portions extending toward a position at which these portions cross each other. Also, the aperture may be V-shaped, W-shaped, or X-shaped. Further, the aperture may be polygon-shaped.

In the liquid crystal display, the lack portion may be shaped to enable application of two-direction electric fields to the liquid crystal layer. In this constitution, two types of, i.e., clockwise and counterclockwise twist-aligned regions may be formed. Since elastic strain energy is increased at a spot where these twist-aligned regions are in contact with each other, the transition of the alignment state of the liquid crystal layer smoothly takes place.

In the liquid crystal display, the second electrode has an aperture including a portion which is 4 $\mu$m wide or less. In this constitution, the electric field strength around the aperture included in the first electrode can be made larger.

In the liquid crystal display, the lack portion may be a cutout portion provided in the second electrode. In this constitution, the liquid crystal molecules around the cutout portion become the transition nucleus and the transition of the alignment state of the liquid crystal layer can take place reliably.

According to the present invention, there is also provided a liquid crystal display comprising: a pair of opposed substrates; a liquid crystal layer disposed between the pair of substrates, the liquid crystal layer having a display alignment state and a non-display alignment state which differ from each other and being subjected to an initialization process so as to be changed from the non-display alignment state to the display alignment state before an image is displayed; a first electrode and a second electrode formed on one of the pair of substrates so as to overlap each other with an insulator interposed therebetween; drive means for generating potential difference between the first electrode and the second electrode to perform the initialization process; and convex portions respectively formed at opposed positions in the pair of the substrates such that the convex portions are protruded in the thickness direction of the liquid crystal layer.

In the constitution, the cell gap in the region with the convex portion is smaller than the cell gap in the region without the convex portion. Thereby, when the potential difference is generated between the first electrode and the second electrode to perform transition of the alignment state of the liquid crystal layer, the electric field strength can be locally increased around the cell gap in the region with the convex portion. As a result, the liquid crystal molecules around the cell gap become the transition nucleus and the transition of the alignment state of the liquid crystal layer can reliably take place.

According to the present invention, there is still further provided a liquid crystal display having: a pair of opposed substrates; and a liquid crystal layer disposed between the pair of substrates, the liquid crystal layer having a display alignment state and a non-display alignment state which differ from each other and being subjected to an initialization process so as to be changed from the non-display alignment state to the display alignment state before an image is displayed; comprising: a first electrode provided on one of the pair of substrates; a second electrode placed between the first electrode and the liquid crystal layer; and drive means for generating potential difference between the first electrode and the second electrode to thereby perform the initialization process, and opposed end portions of two adjacent second electrodes overlap with the first electrode with an insulator interposed therebetween.

In the constitution, when the potential difference is generated between the first electrode and the second electrode to perform transition of the alignment state of the liquid crystal layer, the electric field strength is locally increased between the opposed end portions of the adjacent second electrodes. As a result, the liquid crystal molecules around the region between the opposed end portions become transition nucleuses and the transition of the alignment state of the liquid crystal molecules can reliably take place.

In the liquid crystal display, one of the opposed end portions may have a protrusion in a region overlapping with the first electrode and the other end portion may have a recess corresponding to the protrusion in the region overlapping with the first electrode. In this constitution, the liquid crystal molecules around the region between the protrusion and the corresponding recess become transition nucleus and the transition of the alignment state of the liquid crystal layer can reliably take place.

In the liquid crystal display, distance between the protrusion and the recess may be 4 μm–8 μm. Thereby, without shorting between the first electrodes, the electric field strength between the protrusion and the corresponding recess can be increased.

In the liquid crystal display, the protrusion maybe sawtooth shaped.

In the liquid crystal display, one of the pair of substrates may be an array substrate having a plurality of pixel electrodes provided in matrix; a plurality of gate lines and source lines arranged so as to cross each other; a plurality of switching devices provided as corresponding to the respective pixel electrodes, for switching between a conductive state and a non-conductive state between the pixel electrodes and the source lines in accordance with a drive signal supplied through the gate lines, and the other of the pair of substrates may be an opposing substrate having a counter electrode opposed to the array substrate.

The liquid crystal display, may further comprise storage capacitor electrodes overlapping with the pixel electrodes, and the first electrode may be the storage capacitor electrode and the second electrode may be the pixel electrode.

In the liquid crystal display, the first electrode may be the gate line and the second electrode may be the pixel electrode.

In the liquid crystal display, the insulator may be a color filter or a flattening layer. In this constitution, the color filter or the flattening layer can be used as the insulator between the first electrode and the second electrode.

In the liquid crystal display, an intermediate portion may be formed between a main portion of the second electrode and the end portion of the second electrode so as to have a width smaller than a width of the main portion and a width of the end portion.

In this constitution, by adjusting the width and length of the intermediate portion, the storage capacitance generated between the opposed end portions of the adjacent pixel regions and the storage capacitance generated by the other elements can be well-balanced.

In the liquid crystal display, the first electrode may be comprised of a conductive mask and the second electrode may be the counter electrode.

In the liquid crystal display, the potential difference is preferably 15 V–32 V.

In the liquid crystal display, voltages of different polarities may be respectively applied to adjacent pixel electrodes. Thus, by applying the voltage by so-called dot inverting method, two-direction transversal electric fields can be generated. As a result, two types of, i.e., clockwise or counterclockwise twist-aligned regions can be formed. Since the elastic strain energy is increased at the spot where these twist-aligned regions are in contact with each other, the transition of the alignment state of the liquid crystal layer can take place more smoothly.

In the liquid crystal display, the non-display alignment state may be spray alignment and the display alignment state may be bend alignment. Thereby, a liquid crystal display capable of reliably performing spray-bend transition is realized.

The liquid crystal display, may further comprise: an illuminating device having a light source for emitting red light, green light, and blue light; and illuminating device control means for controlling the illuminating device so as to emit the red light, the green light and the blue light by time division within one frame period. Thereby, a liquid crystal display that employs so-called field sequential color method and is capable of reliably performing transition of the alignment state of the liquid crystal layer can be realized.

According to the present invention, there is still further provided a liquid crystal display comprising: a pair of opposed substrates; a liquid crystal layer disposed between the pair of substrates, the liquid crystal layer having a display alignment state and a non-display alignment state which differ from each other and being subjected to an initialization process so as to be changed from the non-display alignment state to the display alignment state before an image is displayed, and one of the pair of substrates may be an array substrate having a plurality of pixel electrodes provided in matrix; a plurality of gate lines and source lines arranged so as to cross each other; a plurality of switching devices provided as corresponding to the respective pixel electrodes, for switching between a conductive state and a non-conductive state between the pixel electrodes and the source lines in accordance with a drive signal supplied through the source lines, and the other of the pair of substrates may be an opposing substrate having a counter electrode opposed to the array substrate, and a source electrode constituting the switching device may extend from the source line in parallel with the gate line so as to overlap with the gate line and may be interposed between the gate line and the liquid crystal layer, and a drive signal for causing conduction between the pixel electrode and the source lines may be supplied to the gate lines to set the source electrode and the pixel electrodes at equipotential and potential difference is generated between the source line and the gate line to thereby perform the initialization process.

In the liquid crystal display, potential difference may be generated between the counter electrode and the pixel electrode.

In the liquid crystal display, the source electrode may have a bent portion.

This object, as well as other objects, features and advantages of the invention will become more apparent to those skilled in the art from the following description taken with reference to the accompanying drawings.

BRIEF DESCRIPTION OF THE DRAWINGS

FIGS. 37A–37C are views for explaining an initialization process for spray-bend transition in the conventional liquid crystal display, wherein FIG. 37A is a graph showing change in the rate of the spray-bend transition and FIGS. 37B, C are graphs showing waveforms of voltages applied to the liquid crystal display panel during the initialization process.

DETAILED DESCRIPTION OF THE PREFRRED EMBODIMENTS

Hereinafter, preferred embodiments of the present invention will be described with reference to drawings.

First Embodiment

A first embodiment of the present invention embodies a liquid crystal display capable of reliably performing spray-bend transition by providing an aperture in a pixel electrode formed on an inner surface of an array substrate.

Figure 1:
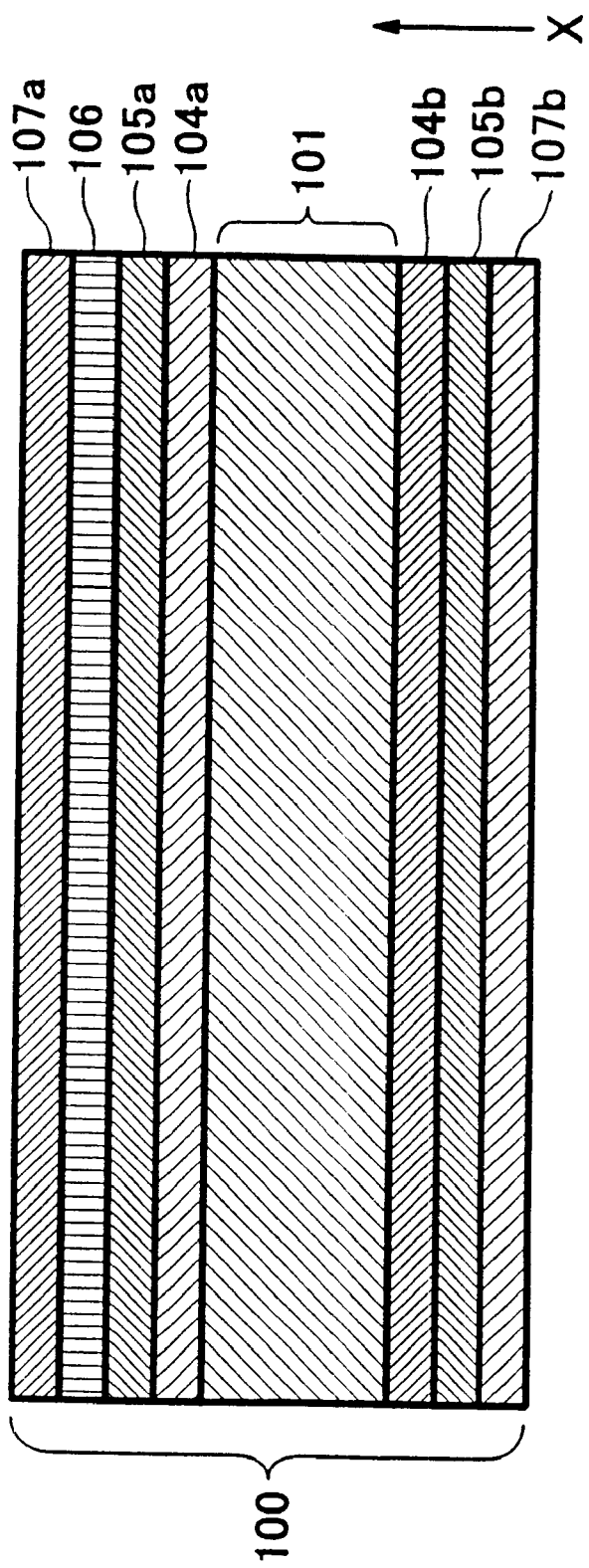
FIG. 1 is a cross-sectional view schematically showing a constitution of a liquid crystal display panel included in a liquid crystal display according to a first embodiment of the present invention.

FIG. 1 is a cross-sectional view schematically showing a constitution of a liquid crystal display panel included in a liquid crystal display according to a first embodiment of the present invention. In FIG. 1, for the sake of convenience, a direction indicated by an arrow X indicates an upper side of the liquid crystal display panel.

Referring now to FIG. 1, a liquid crystal display panel 100 included in the liquid crystal display of this embodiment has a liquid crystal cell 101 described later. A retardation film (hereinafter simply referred to as a negative retardation film) 104a comprised of an optical medium having a negative refractive index anisotropy whose main axes are hybrid-arranged, a negative uniaxial retardation film 105a, a positive uniaxial retardation film 106, and a polarizer 107a are disposed on an upper surface of the liquid crystal cell 101 in this order. A negative retardation film 104b, a negative uniaxial retardation film 105b, and a polarizer 107b are disposed on a lower surface of the liquid crystal cell 101. It should be noted that a negative retardation film 104 and a biaxial retardation film (not shown), and the polarizer may be disposed on each of the surfaces of the liquid crystal cell 101 in this order because the biaxial retardation film functions as both of the negative uniaxial retardation film and the positive uniaxial retardation film.

Figure 2:
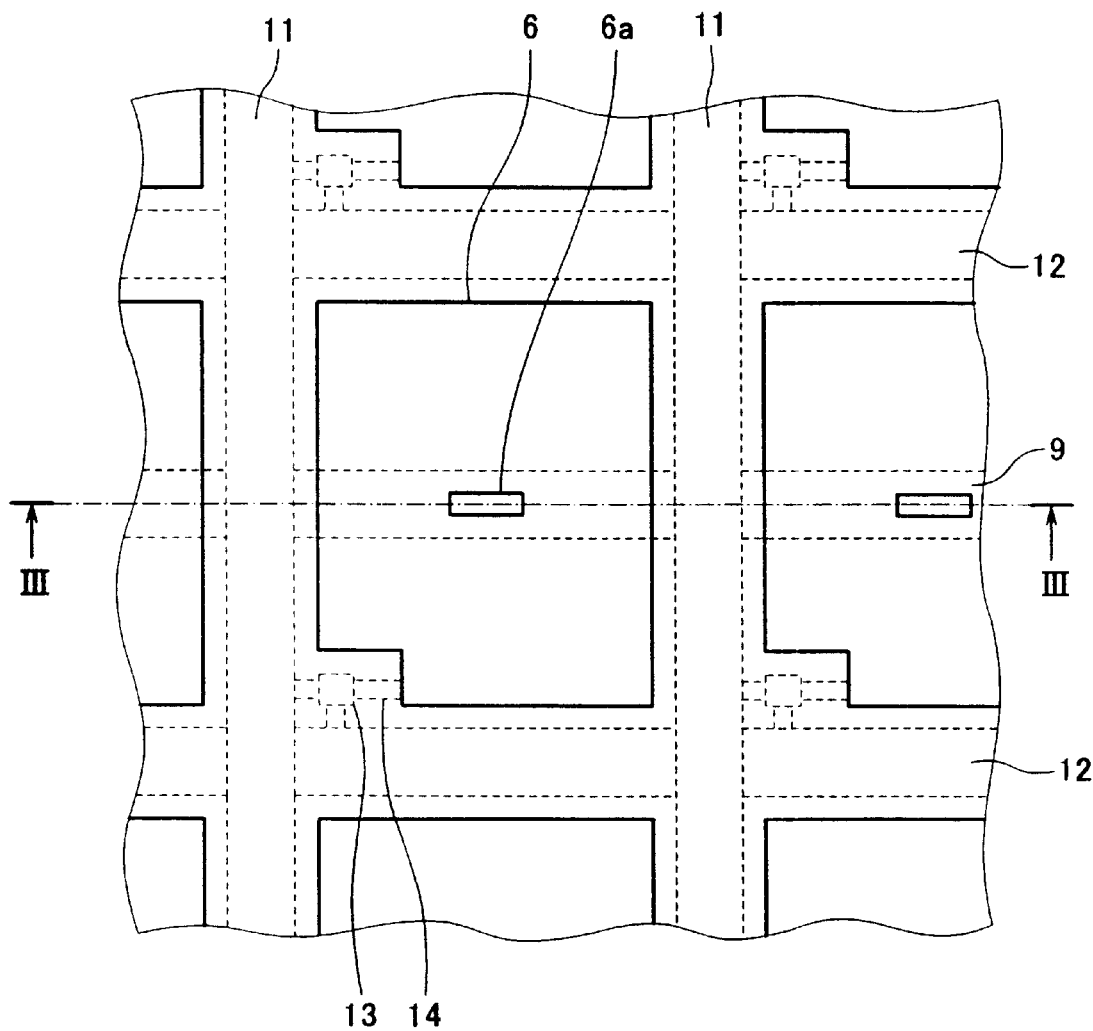
FIG. 2 is a plan view schematically showing a constitution of main elements of the liquid crystal display panel included in the liquid crystal display according to the first embodiment.
Figure 3:
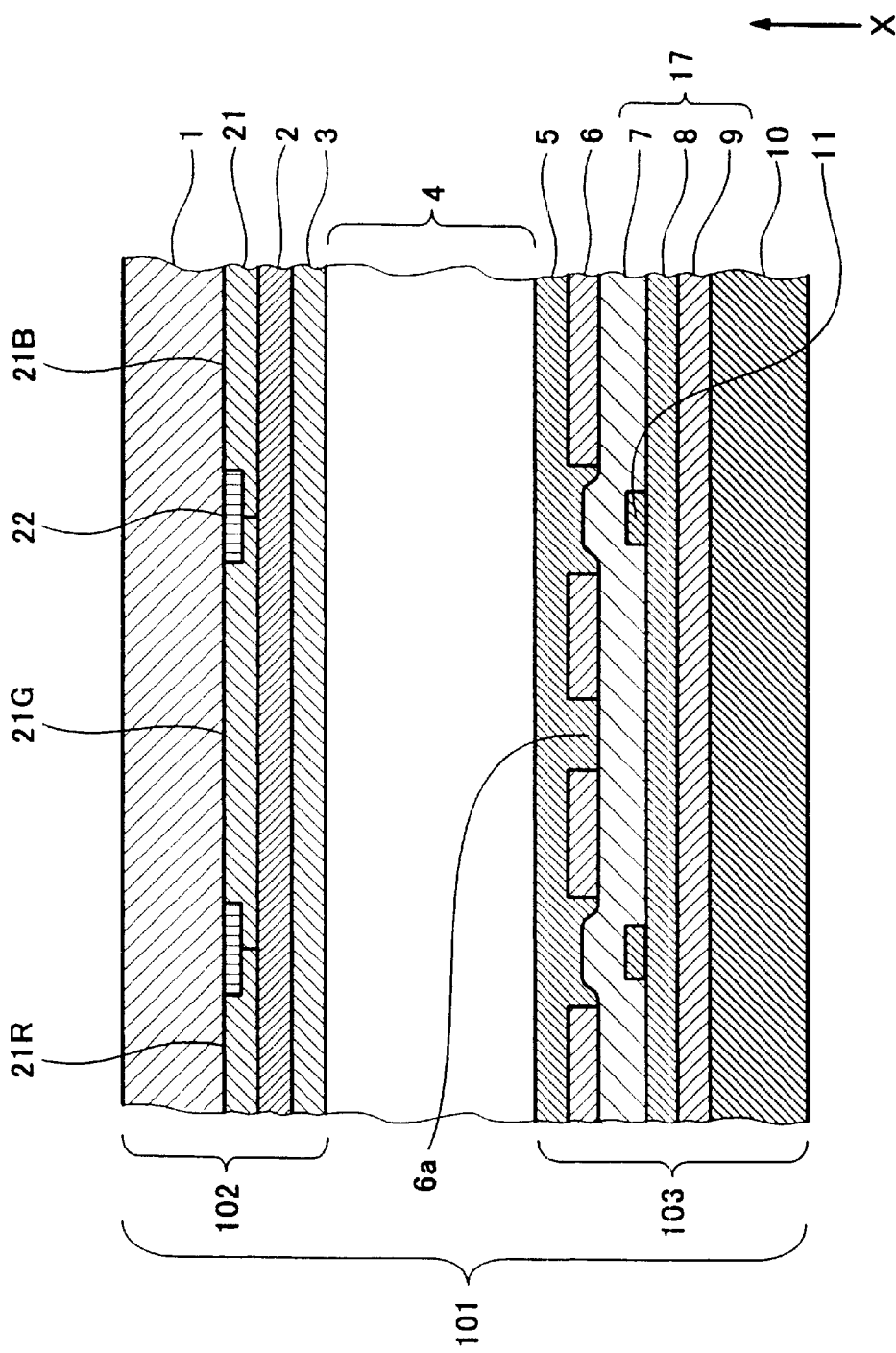
FIG. 3 is a cross-sectional view taken in the direction of arrows substantially along line III—III of FIG. 2.

FIG. 2 shows a plan view schematically showing a constitution of the liquid crystal cell 101. FIG. 3 is a cross-sectional view taken in the direction of arrows substantially along line III—III of FIG. 2. FIG. 4 is an enlarged view of a liquid crystal layer portion in the cross section of FIG. 4. In FIG. 2, for the sake of convenience, elements provided above the pixel electrode are omitted.

Referring to FIGS. 2 3, the liquid crystal cell 101 comprises two substrates, namely, a color filter substrate 102 including a color filter described later and an array substrate 103. The color filter substrate 102 and the array substrate 103 are provided as opposed to each other with a spacer (not shown) interposed therebetween and a liquid crystal layer 4 is provided in a gap between the color filter substrate 102 and the array substrate 103. The liquid crystal layer 4 contains liquid crystal molecules 20 filled thereinto as described with reference to FIG. 4. The liquid crystal molecules 20 are made of a cyano-based liquid crystal material having refractive index anisotropy Δn of 0.2 or more in order to increase Gibbs energy described later.

The color filter substrate 102 is structured such that a color filter layer 21, a transparent electrode (counter electrode) 2, and an alignment layer 3 are disposed on the lower surface of the glass substrate 1. The color filter layer 21 is comprised of a red color filter 21R, a green color filter 21G, and a blue color filter 21B. Black matrixes 22 as masks are respectively provided at boundaries of the color filters.

The array substrate 103 has a glass substrate 10 and a wiring layer 17 is formed on an upper surface of the glass substrate 10. The wiring layer 17 is comprised of gate lines 12 and source lines 11 crossing each other, storage capacitor electrodes 9, and an insulator for preventing conduction between these electrodes. To be more detailed, the storage capacitor electrodes 9 are each formed in parallel with the gate lines 12 so as to be placed at a predetermined position between the gate lines 12. The gate lines 12 and the storage capacitor electrodes 9 are formed in the same layer as a lowermost layer. An insulating layer 8 covers the gate lines 12 and the storage capacitor electrodes 9. The source lines 11 are formed on the upper surface of the insulating layer 8 and an insulating layer 7 covers the source lines 11.

Pixel electrodes 6 are each formed on the upper surface of the wiring layer 17 so as to be located in a pixel region defined by the gate lines 12 and the source lines 11. Since the storage capacitor electrode 9 is provided between the gate lines 12 as described above, the pixel electrode 6 has a region overlapping with the storage capacitor electrode 9 with the insulating layers 7, 8 interposed therebetween. The overlapping region has a rectangular aperture 6a.

An alignment layer 5 covers the pixel electrodes 6 and the wiring layer 17. The alignment layer 5 and the alignment layer 3 provided on the side of the color filter 102 have been subjected to alignment treatment such as known rubbing treatment in order to align the liquid crystal molecules in the liquid crystal layer 4 in parallel with one another and in the same direction. Here, it is assumed that the direction of the alignment treatment is parallel to the source lines 11.

Reference 13 denotes TFTs (Thin Film Transistor) as a semiconductor switching device and reference 14 denotes drain electrodes connecting the TFTs 13 and the pixel electrodes 6.

Figure 4A:
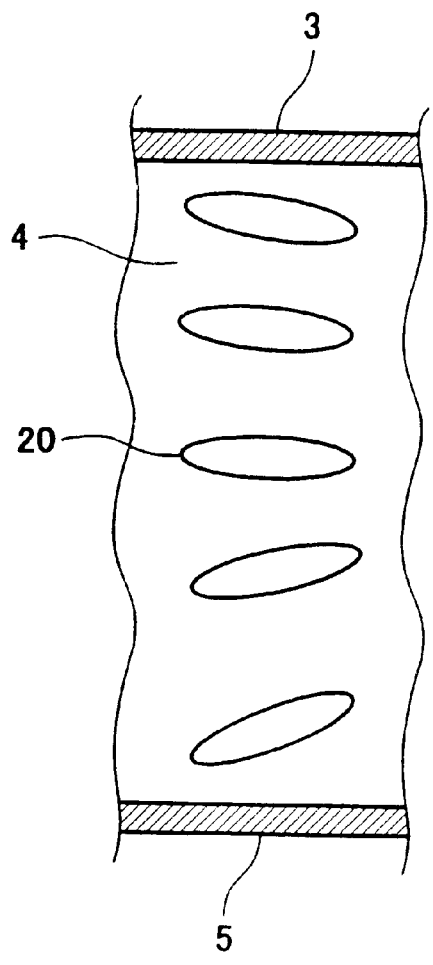
FIG. 4 is an enlarged view of a liquid crystal layer portion in the cross section of FIG. 3.
Figure 4B:
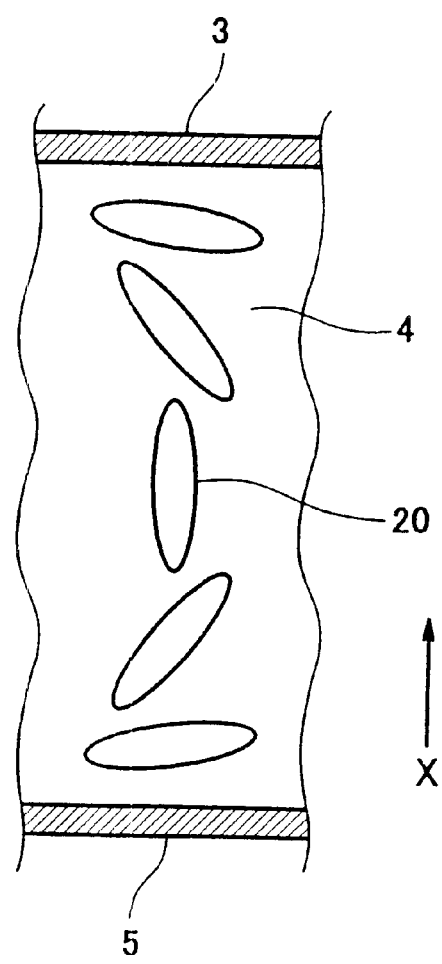

In an initial state of the liquid crystal display panel 100 so constituted, the liquid crystal molecules 20 have spray alignment shown in FIG. 4A. In the liquid crystal display of this embodiment, by applying a certain voltage to the liquid crystal display panel 100 as described later, the liquid crystal molecules 20 are caused to transition from spray alignment to bend alignment of FIG. 4B. In this bend alignment state, an image is displayed in the liquid crystal display. In brief, the liquid crystal display panel 100 is an OCB-mode display panel. Hereinbelow, the voltage applied to the liquid crystal display panel 100 in the spray-bend transition is referred to as a transition voltage.

Figure 5:
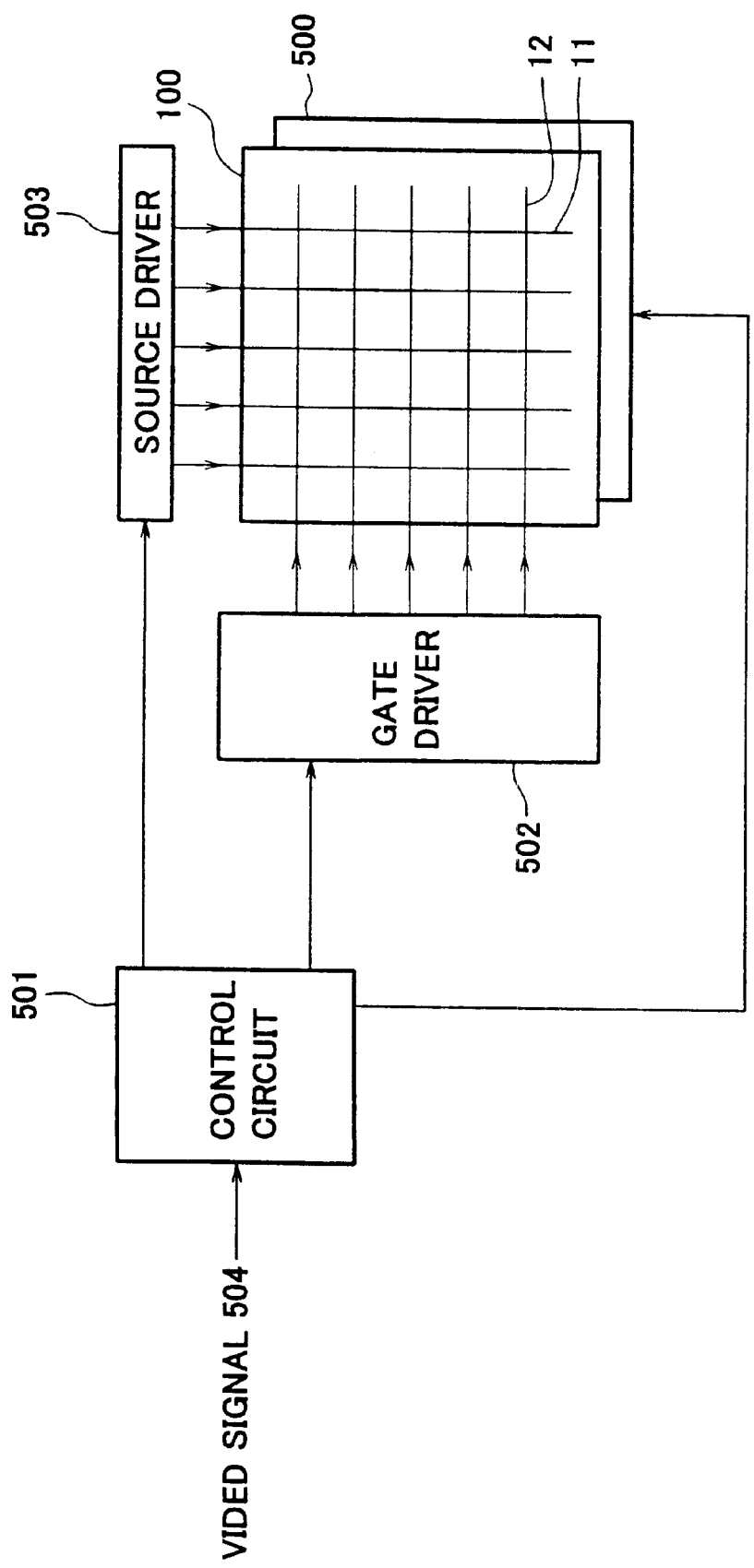
FIG. 5 is a block diagram showing a constitution of the liquid crystal display according to the first embodiment.

FIG. 5 is a block diagram showing a constitution of the liquid crystal display according to the first embodiment. Referring to FIGS. 5, 2, 3, the liquid crystal display panel 100 is a well-known TFT (Thin Film Transistor) type liquid crystal display panel in which the gate lines 12 and the source lines 11 are provided in matrix. In the liquid crystal display panel 100, the gate lines 12 and the sources line 11 are respectively driven by a gate driver 502 and a source driver 503 which are controlled by a control circuit 501.

A backlight 500 is provided below the liquid crystal display panel 100. The backlight 500 is composed of a cathode ray tube or the like for emitting white light.

In the liquid crystal display of this embodiment so constituted, the control circuit 501 outputs control signals to the gate driver 502 and the source driver 503, respectively, according to a video signal 504 externally input. Thereby, the gate driver 502 applies a scanning signal voltage to the gate lines 12, thereby causing the TFTs 13 of the respective pixels to be sequentially turned on, and according to this timing, the source driver 503 sequentially applies a video signal voltage according to the video signal 504 to the pixel electrodes 6 of the pixels through the source lines 11. Thereby, the liquid crystal molecules are modulated and light transmittance of light emitted from the backlight 500 changes. As a result, an image according to the video signal 504 is presented to an observer.

Subsequently, the spray-bend transition in the liquid crystal display of this embodiment so constituted will be described in detail.

Figure 6:
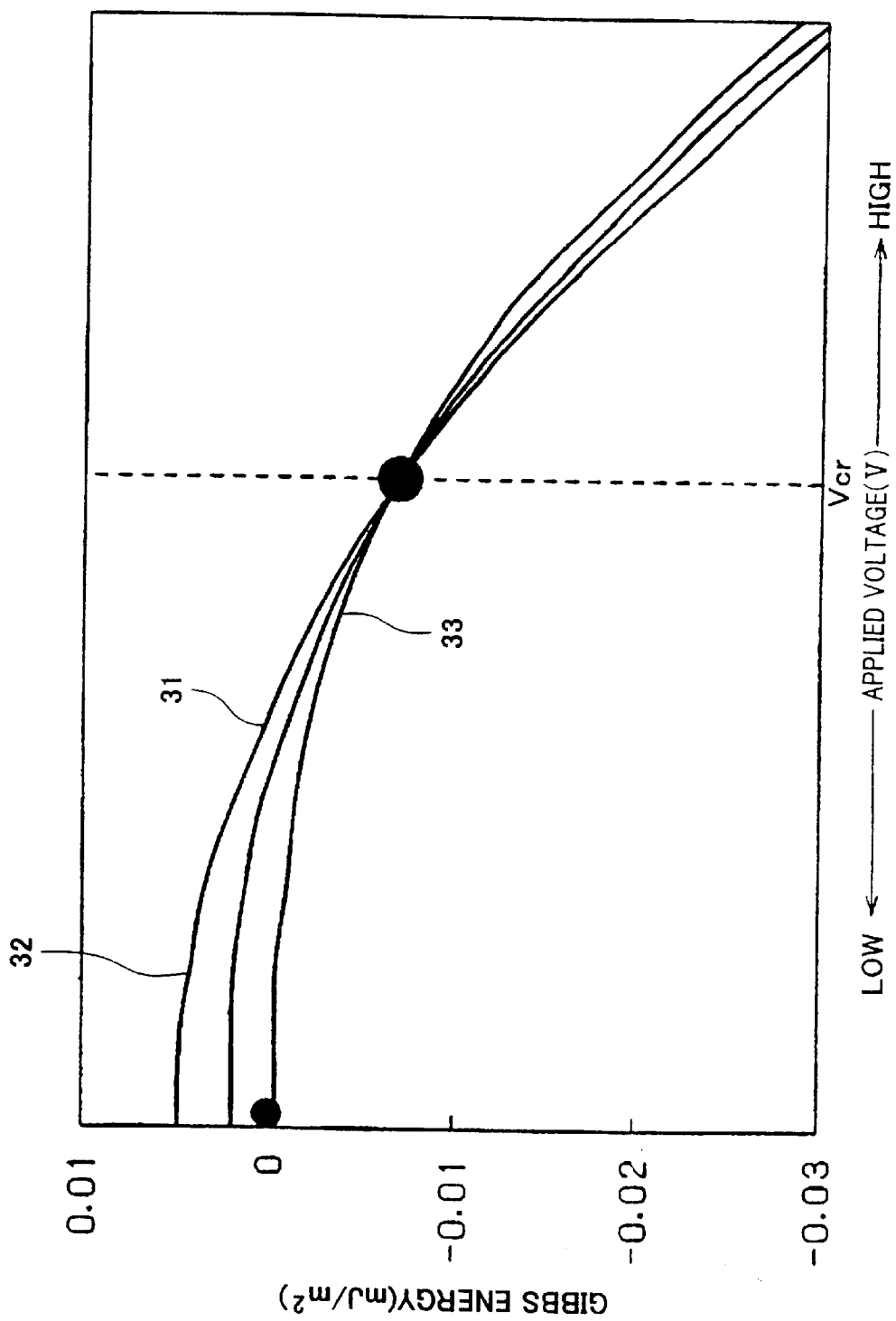
FIG. 6 is a graph showing the relationship between an applied voltage and Gibbs energy.

FIG. 6 is a graph showing the relationship between an applied voltage and Gibbs energy. Here, the Gibbs energy refers to the sum of electric energy and elastic energy.

In FIG. 6, reference numeral 31 indicates applied voltage-Gibbs energy characteristic in the case where the liquid crystal molecules are in the bend alignment state and reference numerals 32, 33 respectively indicate applied voltage-Gibbs energy characteristics in the case where the liquid crystal molecules are in twist alignment and spray alignment states.

Referring to FIG. 6, when the applied voltage is lower than a critical voltage Vcr, the Gibbs energy of the liquid crystal molecules in the spray alignment is lower than that of the liquid crystal molecules in the bend alignment. The event that the Gibbs energy is low is equivalent to the event that a negative energy is high, and therefore, indicates a more stable state. In this case, therefore, the spray alignment is more stable than bend alignment.

This relationship is reversed when the applied voltage is higher than the critical voltage Vcr, and the Gibbs energy in the bend alignment state is lower than that in the spray alignment state. This means that the bend alignment is more stable than spray alignment.

When a relatively high voltage is applied, the liquid crystal molecules tend to transition to the bend alignment which are more stable than the spray alignment. So, when there is a spot where an electric field strength is locally high, the liquid crystal molecules around the spot transition to the bend alignment and such transition spreads to the other liquid crystal molecules. In other words, the liquid crystal molecules around the spot where the electric field strength is locally high becomes the transition nucleus and the spray-bend transition takes place.

In the liquid crystal display of this embodiment, the liquid crystal molecules around the aperture 6a formed in the pixel electrode 6 become the transition nucleus. Hereinafter, this will be explained.

For the purpose of measuring electric field distribution in the vicinity of the aperture 6a of the pixel electrode 6, an electric field simulation is carried out in the liquid crystal display of this embodiment. Specifically, +7 V voltage and a −25 V voltage are respectively applied to the pixel electrode 6 and the storage capacitor electrode 9 and change in the electric field strength is observed. Here, the aperture 6a is rectangle which is 4 μm wide and 8 μm long.

Figure 7:
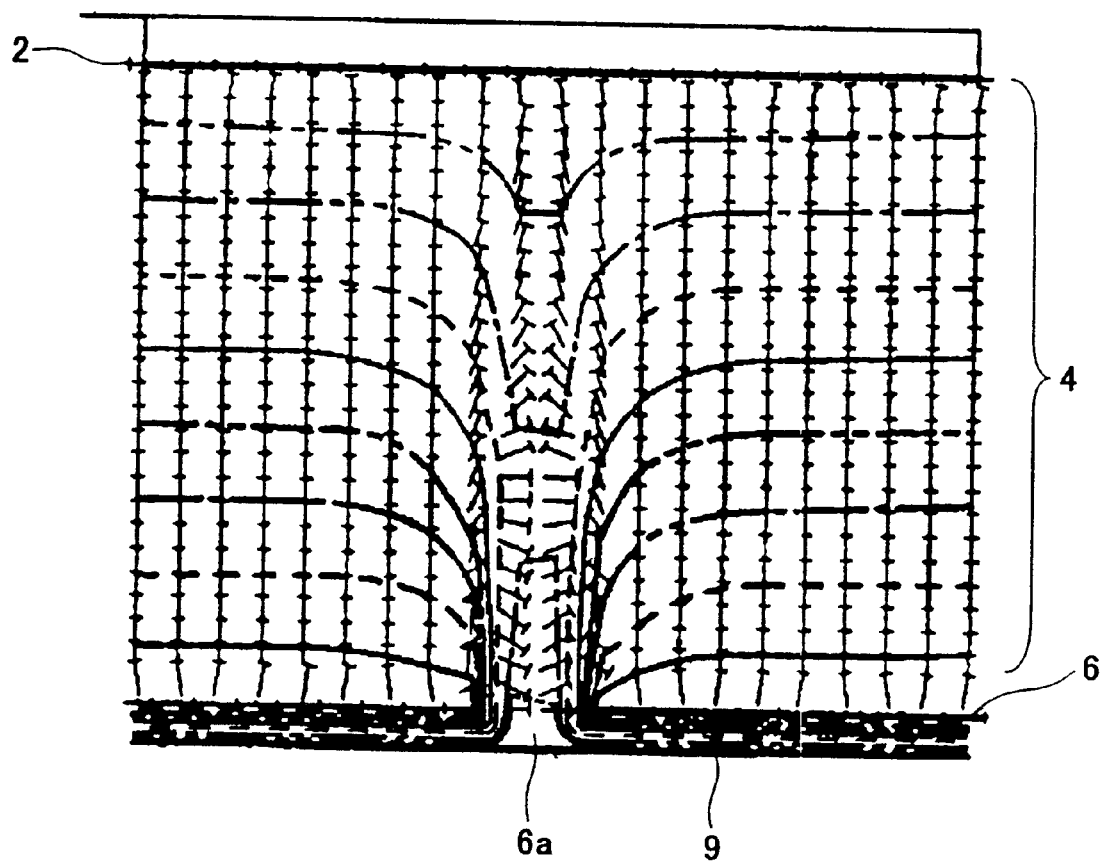
FIG. 7 is a view showing lines of equipotential of a cross section of a pixel in the liquid crystal display according to the first embodiment.
Figure 8:
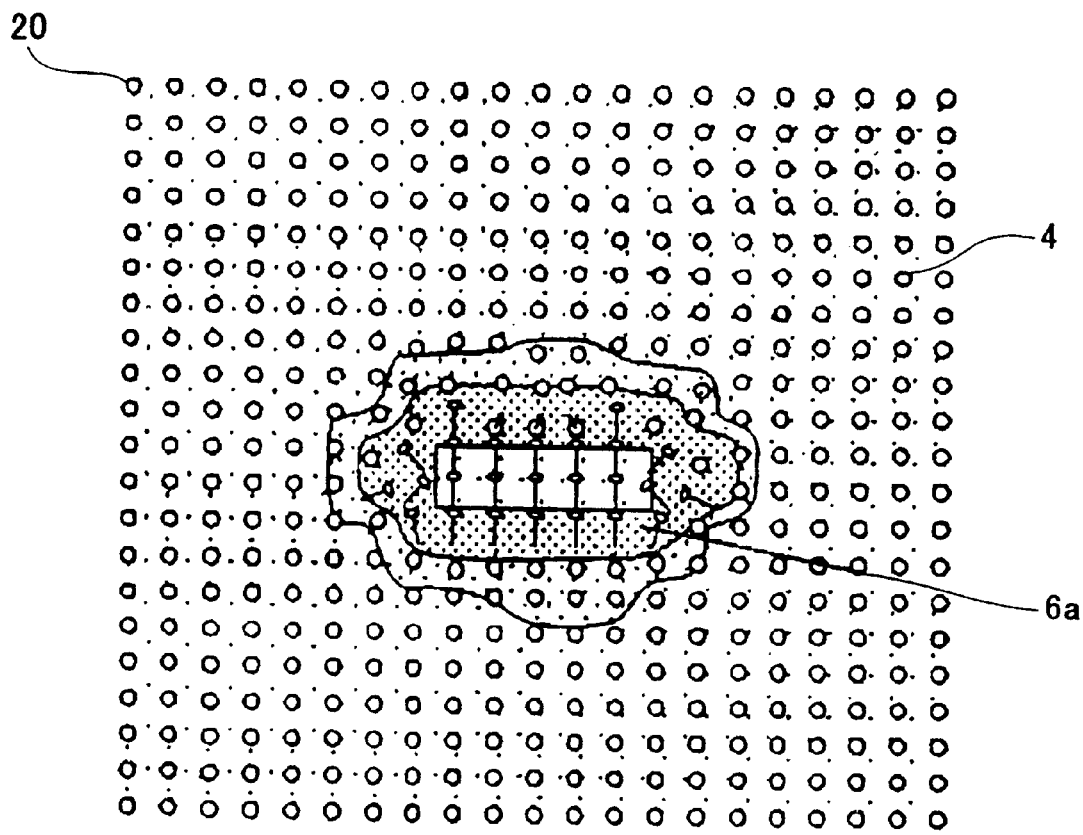
FIG. 8 is a view showing distribution of the Gibbs energy in a plane of the pixel in the liquid crystal display according to the first embodiment.

FIGS. 7. 8 are views showing a result of the electric field simulation. FIG. 7 shows equipotential lines of a cross section of an arbitrary pixel in the liquid crystal display of this embodiment and FIG. 8 shows distribution of Gibbs energy on a plane of the pixel. In FIG. 8, a denser region represents that negative energy is higher (Gibbs energy is lower).

As shown in FIG. 7, the equipotential lines are dense around the aperture 6a. This shows that the electric field strength is locally high around the aperture 6a, that is, electric field concentration occurs. This is due to the fact that the aperture 6a is provided in the region where the pixel electrode 6 overlaps with the storage capacitor electrode 9 and different voltages are applied to the pixel electrode 6 and the storage capacitor electrode 9. As can be seen from FIG. 8, the negative energy is high around the aperture 6a. It was confirmed that the spray-bend transition is facilitated around the aperture 6a. That is, it was found that the liquid crystal molecules around the aperture 6a become the transition nucleus.

As described above, in the liquid crystal display, each of the pixel electrodes 6 has the aperture 6a. This means that the transition nucleus is present in each pixel. Consequently, pixels in the spray alignment state are not left and the spray-bend transition reliably takes place.

Subsequently, waveforms of the transition voltage in the liquid crystal display of this embodiment and a method for applying the transition voltage will be explained.

Figure 9:
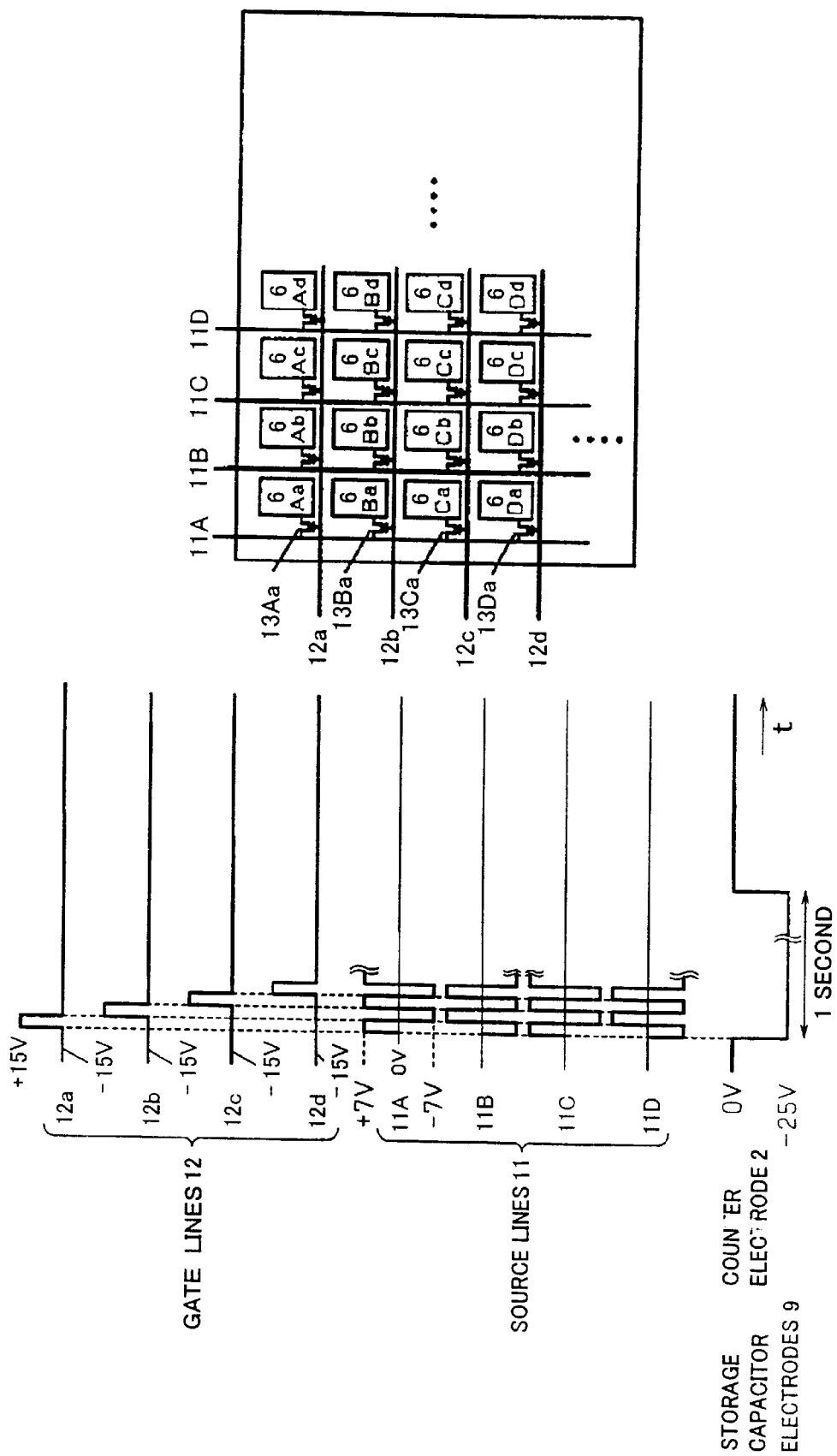
FIG. 9 is a view showing an example of waveforms of a transition voltage in the liquid crystal display according to the first embodiment.

FIG. 9 is a view showing waveforms of the transition voltage in the liquid crystal display of this embodiment. In the liquid crystal display of this embodiment, as shown in FIG. 9, an AC rectangular wave voltage input to respective pixel electrodes 6Aa, 6Cc . . . through source lines 11A, 11C . . . on odd columns and an AC rectangular wave voltage input to respective pixel electrodes 6Bb, 6Dd . . . through source lines 11B, 11D . . . on even columns are reversed in polarity.

In this case, first of all, +15 V voltage as a drive signal is applied to the gate line 12a on a first row, thereby causing sequentially TFTs 13A*a*, 13A*b*, 13A*c*, . . . of the pixel electrodes 6A*a*, 6A*b*, 6A*c* . . . on the first row to be sequentially turned on. When the TFTs 13A*a*, 13A*b*, 13A*c* . . . are turned on, +7 V voltage is being applied to the source lines 11A, 11C . . . , as shown in FIG. 9. Thereby, +7 V voltage is applied from the source lines 11A, 11C . . . to the pixel electrodes 6A*a*, 6A*c* . . . , through the TFTs 13A*a*, 13A*c* . . . , respectively. Likewise, when the TFTs 13A*a*, 13A*b*, 13A*c* . . . are turned on, −7 V voltage is being applied to the source lines 11B, 11D . . . Thereby, −7 V voltage is applied from the source lines 11B, 11D . . . to the pixel electrodes 6A*b*, 6A*d* . . . , through the TFTs 13A*b*, 13A*d* . . . , respectively.

Then, −15 V voltage is applied to the gate line 12*a* on the first row, thereby causing the TFTs 13A*a*, 13A*b*, 13A*c* . . . of the pixel electrodes 6A*a*, 6A*b*, 6A*c* on the first row to be sequentially turned off. Simultaneously, +15 V voltage is applied to the gate line 12*b* on the second row, thereby causing the TFTs 13B*a*, 13B*b*, 13B*c* . . . of the pixel electrodes 6B*a*, 6B*b*, 6B*c* on the second row to be sequentially turned on. When the TFTs 13B*a*, 13B*b*, 13B*c* . . . are turned on, −7 V voltage is being applied to the source lines 11A, 11C . . . , as shown in FIG. 9. Therefore, −7 V voltage is applied from the source lines 11A, 11C . . . to the pixel electrodes 6B*a*, 6B*c* . . . , through the TFTs 13B*a*, 13B*c* . . . , respectively. Likewise, when the TFTs 13B*a*, 13B*b*, 13B*c* . . . are turned on, +7 V voltage is being applied to the source lines 11B, 11D . . . Therefore, +7 V voltage is applied from the source lines 11B, 11D . . . to the pixel electrodes 6B*b*, 6B*d* . . . through the TFTs 13B*b*, 13B*d* . . . , respectively.

By applying the AC rectangular wave voltage to the respective pixel electrodes 6 from the source lines 11 by sequentially applying +15 v voltage to all the gate lines 12, the plus voltage is applied to the pixel electrodes 6A*a*, 6C*a*, 6A*c*, 6C*c* . . . on the odd rows and columns and the pixel electrodes 6B*b*, 6D*b*, 6B*d*, 6D*d* . . . on the even rows and columns, while the minus voltage is applied to the pixel electrodes 6B*a*, 6D*a*, 6B*c*, 6D*c* . . . on the even rows and odd columns and the pixel electrodes 6A*b*, 6C*b*, 6A*d*, 6C*d* . . . on the odd rows and even columns.

Figure 11:
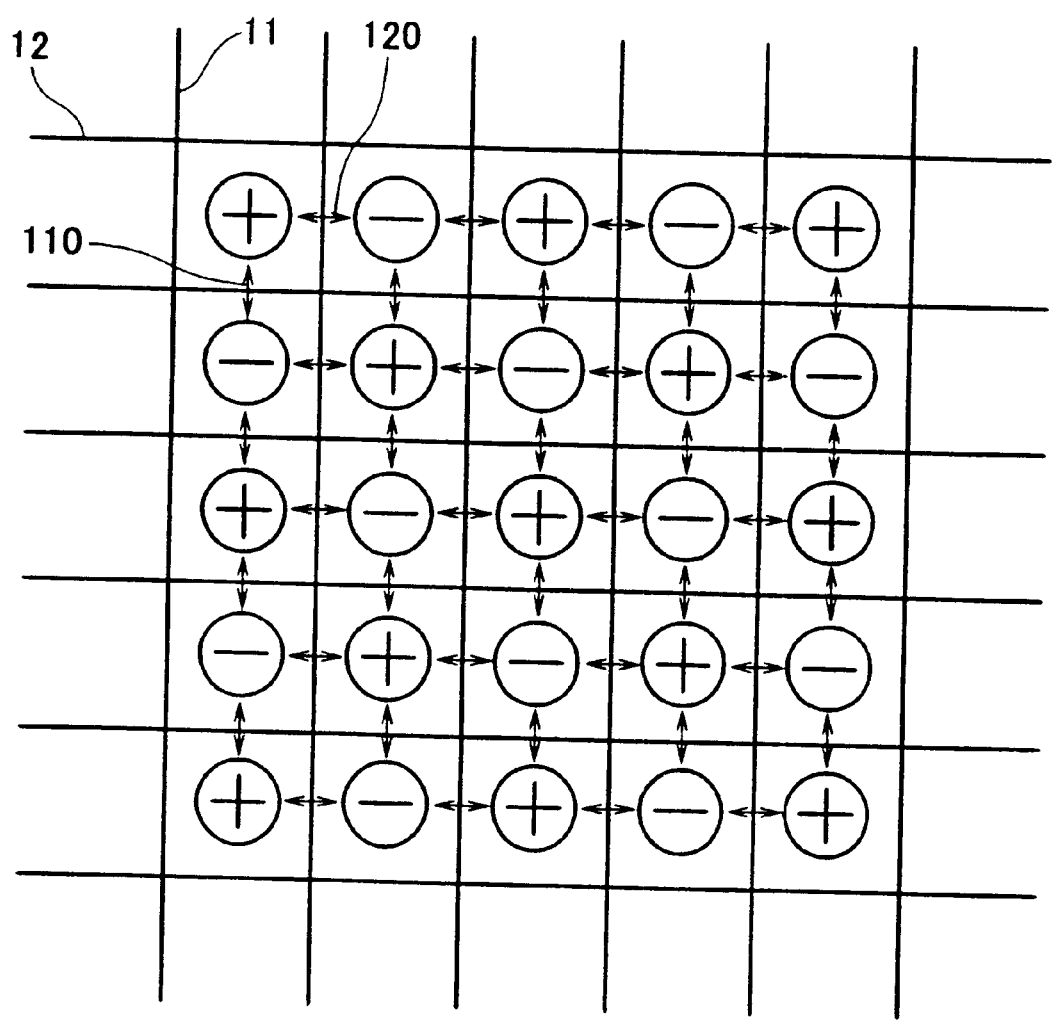
FIG. 11 is a view for explaining a dot inverting method.
Figure 12:
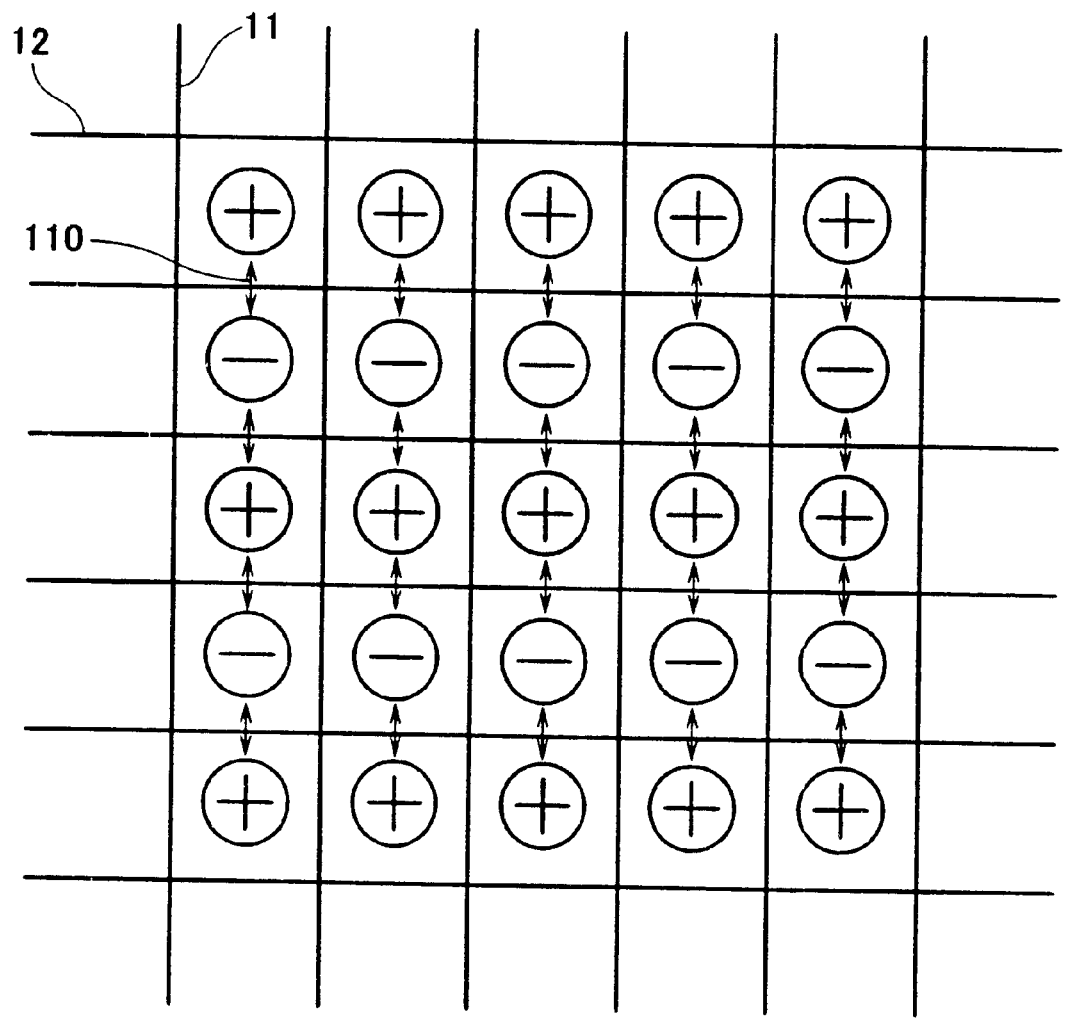
FIG. 12 is a view for explaining a line inverting method.

Thereby, the electric field is generated between each of the pixel electrodes 6A*a*, 6B*a*, 6C*a*, 6D*a* . . . on the odd columns and each of the pixel electrodes 6A*b*, 6B*b*, 6C*b*, 6D*b* . . . on the even rows, as well as between each of the pixel electrodes 6A*a*, 6C*a* . . . on odd rows and each of the pixel electrodes 6B*a*, 6D*a* . . . on even rows, which is shown in FIG. 11.

When the dot inverting method in which the voltage polarity is reversed for every dot, a transversal electric field which is parallel to the substrate is generated in each pixel. The transverse electric field has two directions respectively indicated by arrows 110, 120 (length direction of the source line 11 and length direction of the gate line 12). For this reason, two types of, i.e., clockwise and counterclockwise, twist-aligned regions are formed. Around a spot where these twist-aligned regions are in contact with each other, elastic strain energy is increased, which results in increased negative energy. This facilitates the spray-bend transition.

While the voltage is being applied to the pixel electrodes 6 in the above-described manner, −25 V voltage is applied to the counter electrode 2 and the storage capacitor electrode 9 for one second as shown in FIG. 9.

By applying the transition voltage, the potential difference in the thickness direction of the liquid crystal display panel 100 is increased. Since the pixel electrode 6 has the aperture 6*a* in the region overlapping with the storage capacitor electrode 9 with the insulator interposed therebetween, the increase in the potential difference in the thickness direction of the liquid crystal display panel causes the strong electric field concentration to occur around the aperture 6*a*. As a result, the liquid crystal molecules around the aperture 6*a* formed in each pixel electrode 6 become the transition nucleus and the spray-bend transition reliably takes place.

The counter electrode 2 and the storage capacitor electrode 9 may be shorted in structure. The voltage is not necessarily sequentially applied to the respective gate lines 12 but a gate-on potential may be continuously applied thereto during the initialization process.

While the potential difference generated between the counter electrode 2 and the pixel electrode 6 by respectively applying −25 V, +/−7 V to these electrodes, is 32 V maximum, other values, i.e., values sufficient to generate the transition nucleus may be adopted. Specifically, the voltage is approximately 10–35 V and preferably 15–32 V.

Figure 10:
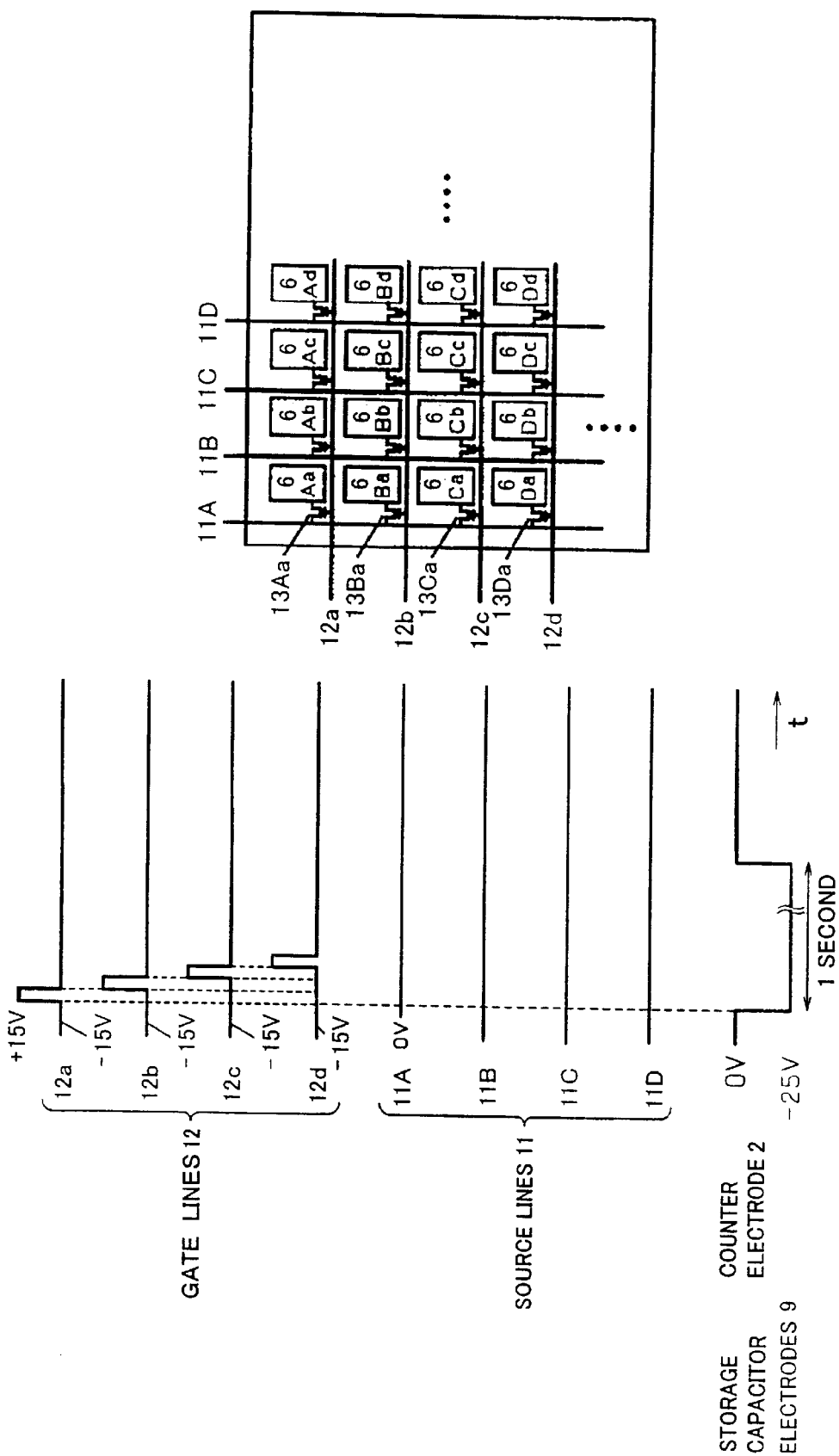
FIG. 10 is a view showing another example of waveforms of the transition voltage in the liquid crystal display according to the first embodiment.

The transition voltage having the waveforms of FIG. 10 may be employed. In this case, differently from the case of FIG. 9, no voltage is applied to the pixel electrodes 6 by keeping the source lines 11 at potential of 0 V and −25 V voltage is applied to the counter electrode 2 and the storage capacitor electrode 9 for one second. Also in this case, the spray-bend transition reliably takes place as in the case of using the transition voltage of the waveforms of FIG. 9.

In some cases where the voltage is being applied to the liquid crystal layer 4, i.e., across the pixel electrode 6 and the counter electrode 2, before the transition voltage is applied, the spray-bend transition does not smoothly take place due to formation of the spray alignment with the liquid crystal molecules arranged asymmetrically. It is therefore desirable that no voltage is applied across the pixel electrode 6 and the counter electrode 2 just before application of the transition voltage. Thereby, since the spray alignment with the liquid crystal molecules arranged symmetrically can be maintained without application of the voltage to the liquid crystal layer 4, the transition to the bend alignment smoothly takes place.

Instead of the dot inverting method, the transition voltage may be applied according to the line inverting method in which the voltage polarity is reversed for every line. In this case, one-direction (indicated by arrow 110) transversal electric field is generated and facilitates the spray-bend transition While the aperture 6*a* of the pixel electrode 6 is rectangular in the liquid crystal display according to the embodiment as described above, another shapes described below may be adopted.

Figure 13:
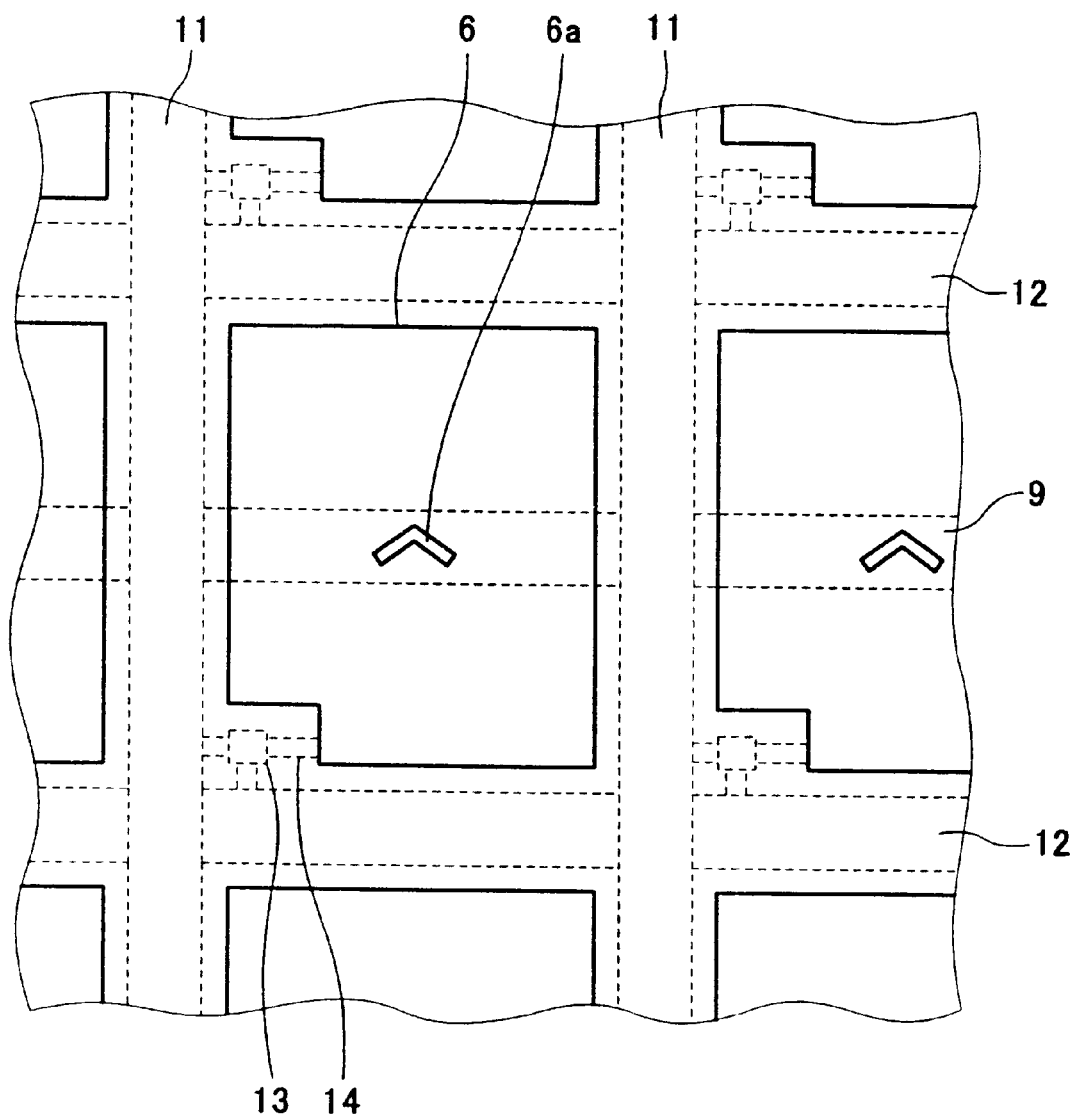
FIG. 13 is a plan view schematically showing another constitution of main elements of the liquid crystal display panel included in the liquid crystal display according to the first embodiment.

FIGS. 13 through 16 are plan views showing the another shapes of the aperture 6*a* of the pixel electrode 6. The aperture 6*a* of the pixel electrode 6 of FIG. 13 is comprised of two straight-line portions extending toward a position at which these portions cross each other. The one end portions of the straight-line portions are in contact with each other, thereby forming an inverted-V shape. This shape is capable of generating two-direction transversal electric fields and thereby forming two types of clockwise and counterclockwise twist-aligned regions. As a result, at the spot where these twist-aligned regions are in contact with each other, the elastic strain energy, and hence, the negative energy are increased. By locally increasing the negative energy, the liquid crystal molecules around the aperture 6*a* become the transition nucleus and the spray-bend transition smoothly takes place.

Instead of the inverted V-shape, the shape obtained by rotating the inverted V-shape in multiples of 90 degrees, including V-shape, may be adopted. With such shapes, the two types of twist-aligned regions can also be formed.

Figure 14:
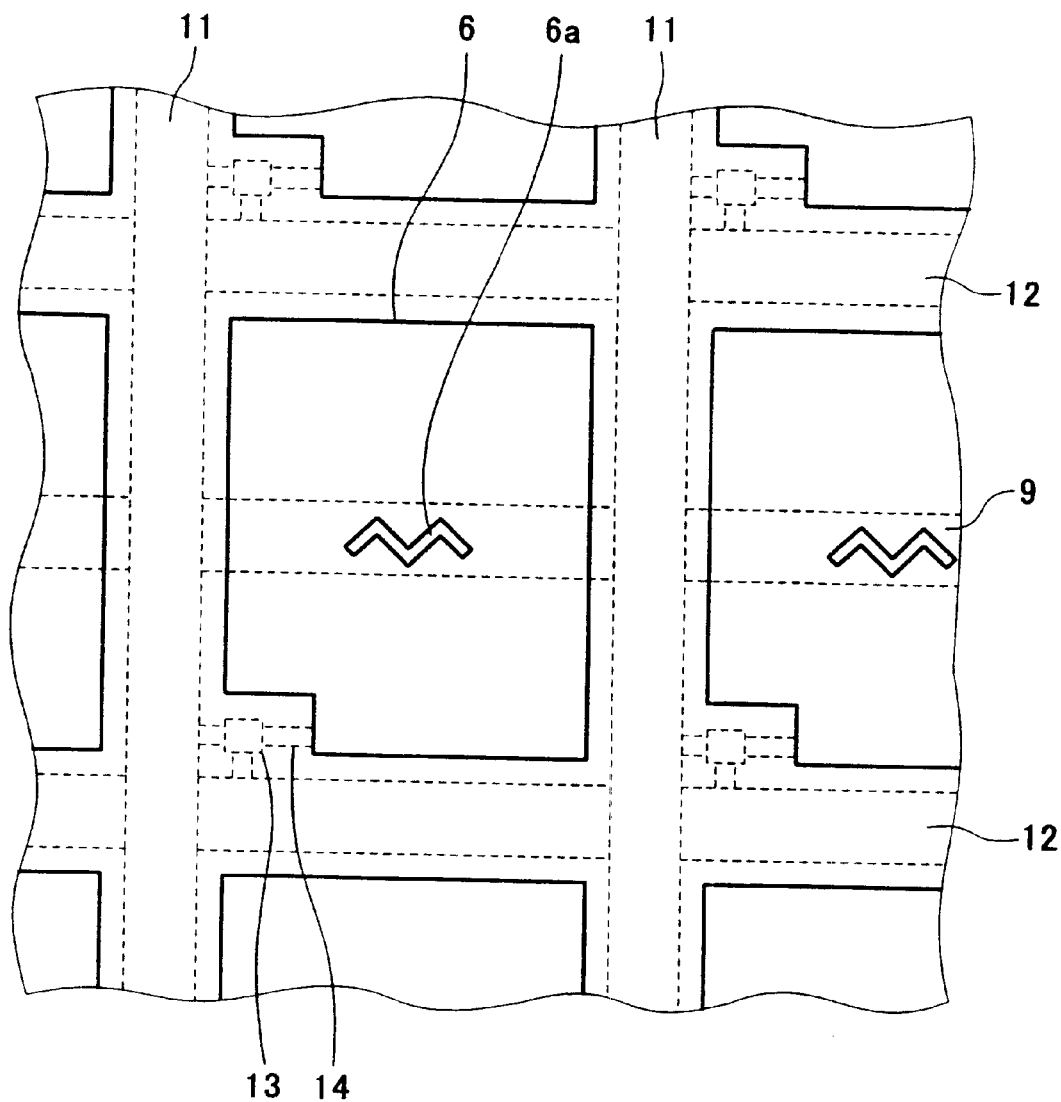
FIG. 14 is a plan view schematically showing still another constitution of the main elements of the liquid crystal display panel included in the liquid crystal display according to the first embodiment.

The aperture 6a of the pixel electrode 6 of FIG. 14 is of an inverted-W shape with two continuous inverted V shapes. With this shape, the two types of twist-aligned regions can be formed.

Instead of the inverted-W shape, it is needless to say that the shape obtained by rotating the inverted-W shape in multiples of 90 degrees, may be adopted. Three or more continuous inverted-V shapes may be adopted.

Figure 15:
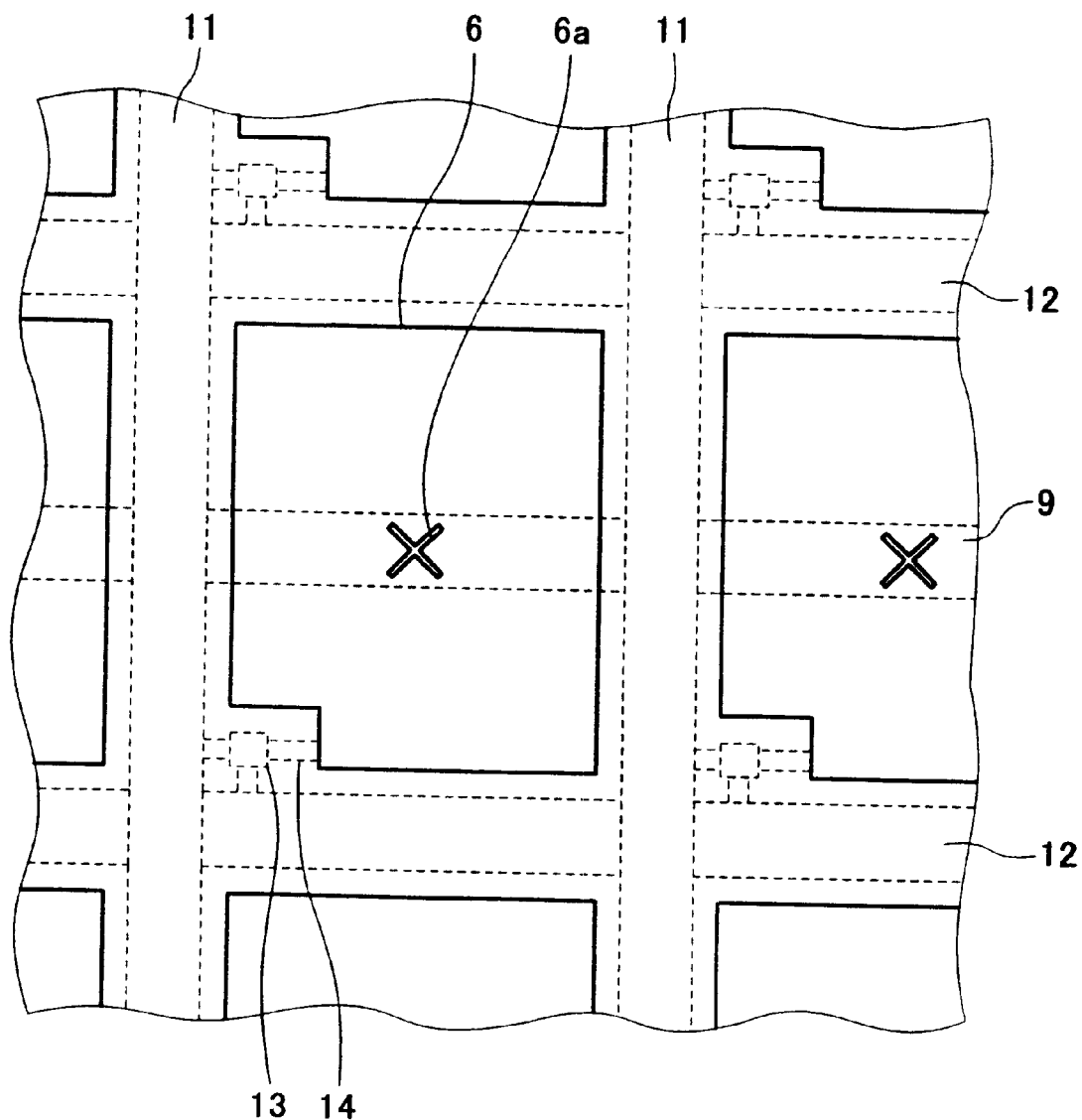
FIG. 15 is a plan view schematically showing a further constitution of main elements of the liquid crystal display panel included in the liquid crystal display according to the first embodiment.

The aperture 6a of the pixel electrode 6 of FIG. 15 is comprised of two straight-line portions as in the case of FIG. 13 and is X-shaped in which their central portions cross each other. With this shape, the two types of twist-aligned regions can also be formed.

Figure 16:
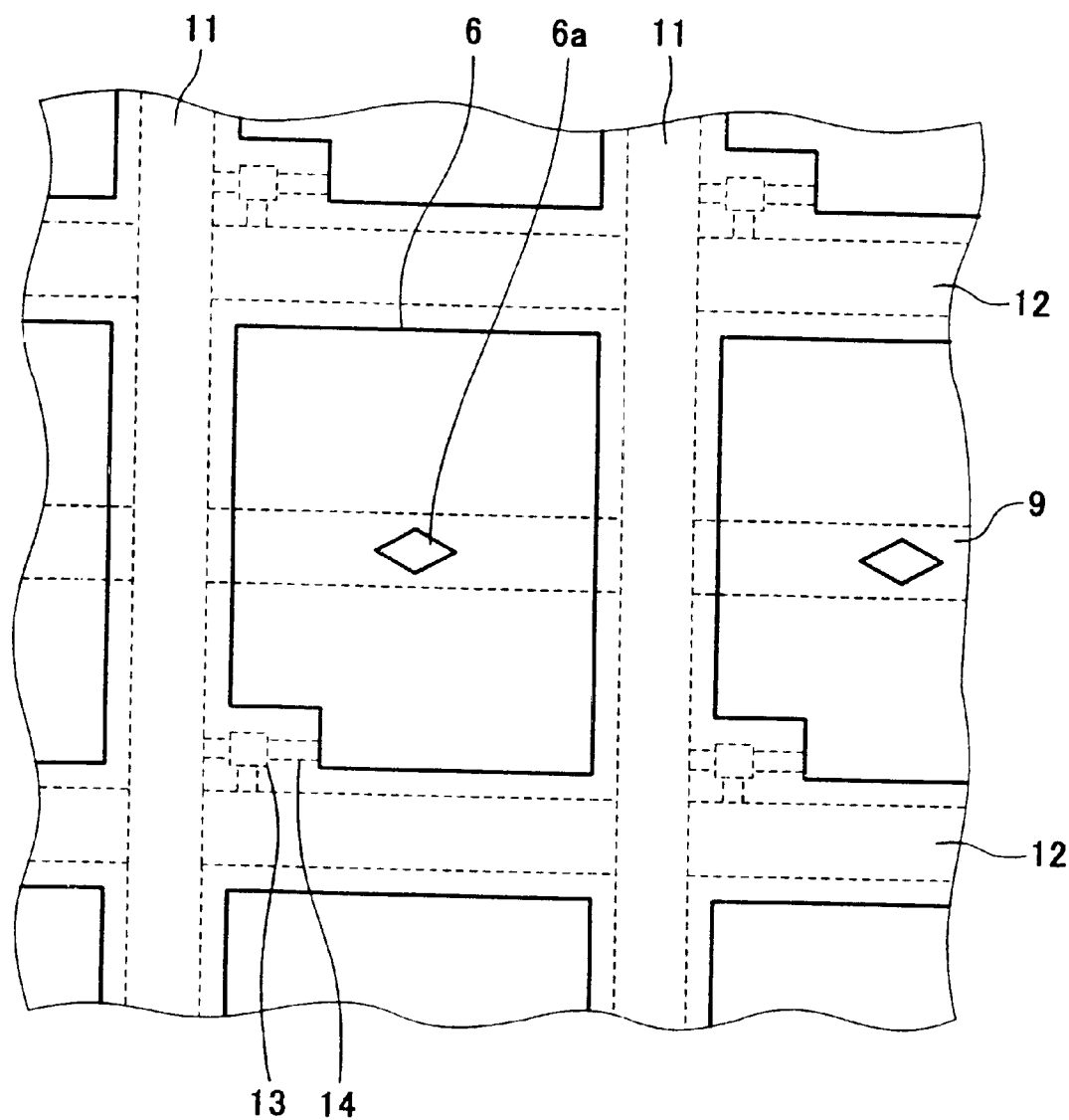
FIG. 16 is a plan view schematically showing a still further constitution of main elements of the liquid crystal display panel included in the liquid crystal display according to the first embodiment.

The aperture 6a of the pixel electrode 6 of FIG. 16 is of a rhombus shape. Other than the rhombus, polygons such as a triangle and a parallelogram, may be adopted. With such shapes, the two types of twist-aligned regions can also be formed.

The aperture 6a of the pixel electrode 6 may be of various types of shapes as described above and a width and size thereof are not uniquely determined. Nevertheless, it is preferable that the width is relatively small for the purpose of generating stronger electric field concentration. Specifically, the aperture 6a preferably has a portion of 4 µm wide or less.

Second Embodiment

A second embodiment of the present invention illustrates a liquid crystal display provided with a flattening layer 18.

The source lines 11 are each provided between the pixel electrodes 6 in the liquid crystal display of the first embodiment as shown in FIG. 2, and part of the first insulating layer 7 forms a convex portion between the pixel electrodes 6 as corresponding to the thickness of the source line 11. For this reason, the distance between the pixel electrodes 6 needs to be greater than the width of the convex portion and as a result, an aperture ratio is reduced. Accordingly, in this embodiment, the flattening layer 18 is provided as described below.

Figure 17:
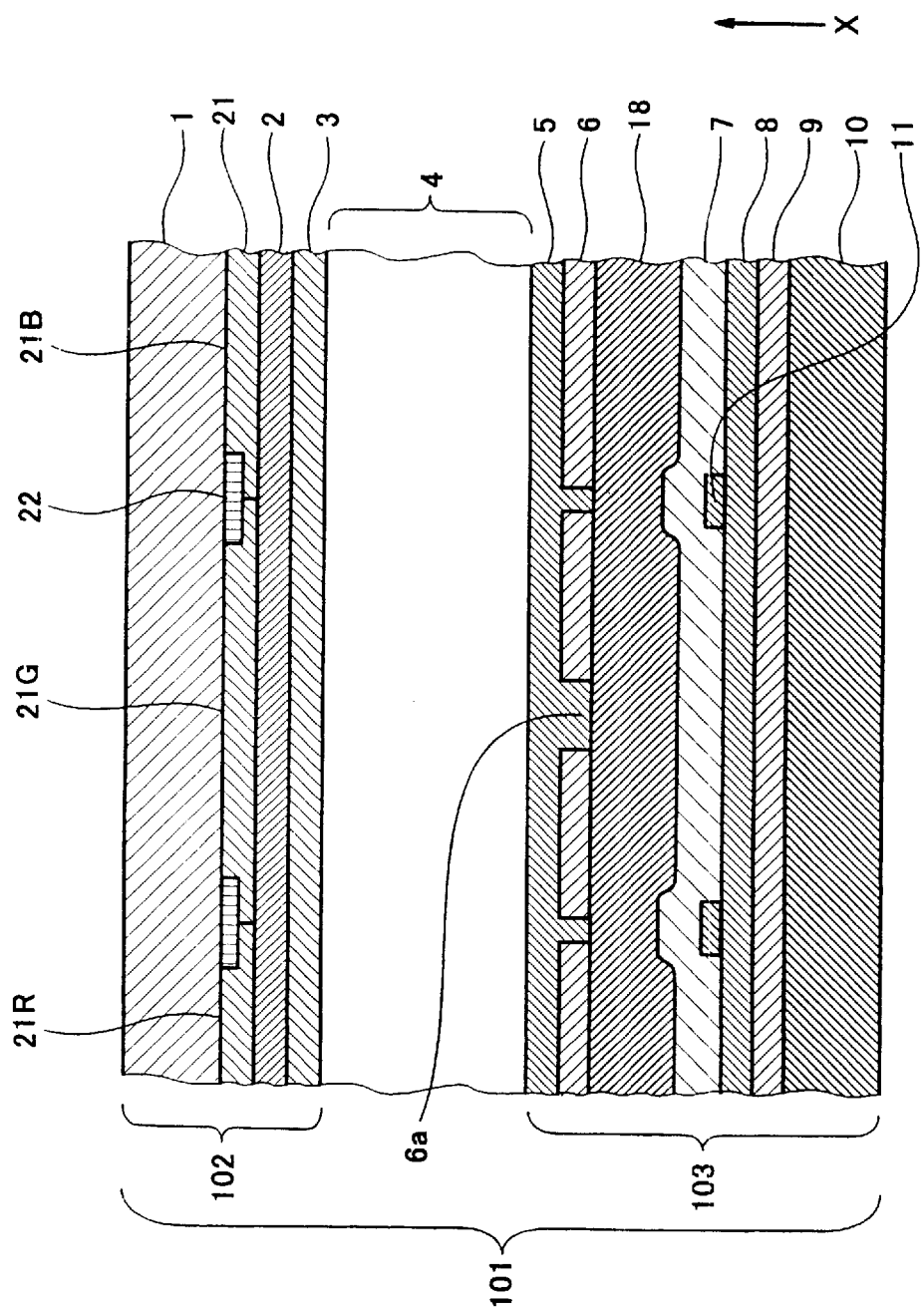
FIG. 17 is a cross-sectional view schematically showing a constitution of a liquid crystal display panel included in a liquid crystal display according to a second embodiment of the present invention.

FIG. 17 is a cross-sectional view schematically showing a constitution of the liquid crystal display panel included in the liquid crystal display of this embodiment. As shown in FIG. 17, the flattening layer 18 made of a resin material such as acryl-based resist covers the surface of the first insulating layer and the pixel electrodes 6 are formed on the flattening layer 18.

Since the other elements are identical to those of the first embodiment, the same or corresponding parts are denoted by the same reference numerals and as such, will not be described herein.

The provision of the flattening layer 18 can reduce the distance between the pixel electrodes 6. This can increase the aperture ratio, and therefore, sufficiently bright display is achieved with power consumption reduced.

The flattening layer 18 not only serves to flatten unevenness of the layer but also serves as an insulator between the pixel electrode 6 and the storage capacitor electrode 9.

Third Embodiment

A third embodiment of the present invention illustrates a liquid crystal display in which the color filter layer is formed on the side of the array substrate.

Figure 18:
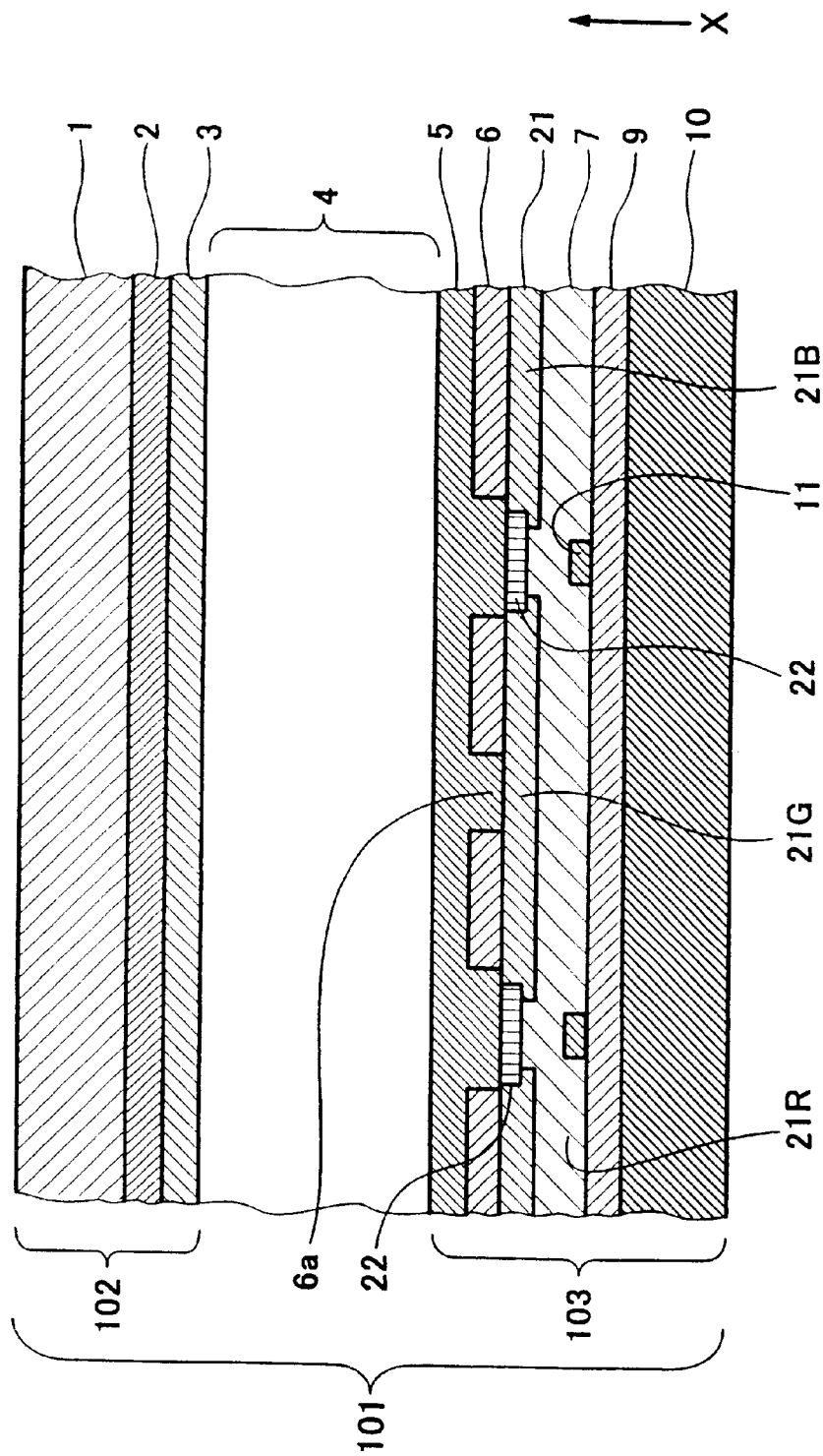
FIG. 18 is a cross-sectional view schematically showing a constitution of a liquid crystal display panel included in a liquid crystal display according to a third embodiment of the present invention.

FIG. 18 is a cross-sectional view schematically showing a constitution of a liquid crystal display panel included in a liquid crystal display of this embodiment. As shown in FIG. 18, a color filter layer 21 comprised of color filters 21R, 21G, 21B and black matrixes 22 provided between the filter 21R and the filter 21G and between the filter 21G and the filter 21B is formed on the insulating layer 7 provided on the side of the array substrate 103.

Since the other elements are identical to those of the first embodiment, the same or corresponding parts are denoted by the same reference numerals and as such, will not be described herein.

In this constitution, the color filter layer 21 not only functions as the insulator between the pixel electrodes 6 and the storage capacitor electrode 9 but also a filter for color display.

Fourth Embodiment

A fourth embodiment of the present invention illustrates a liquid crystal display capable of reliably performing spray-bend transition by providing apertures in the pixel electrode and the source line formed on the inner surface of the array substrate.

Figure 19:
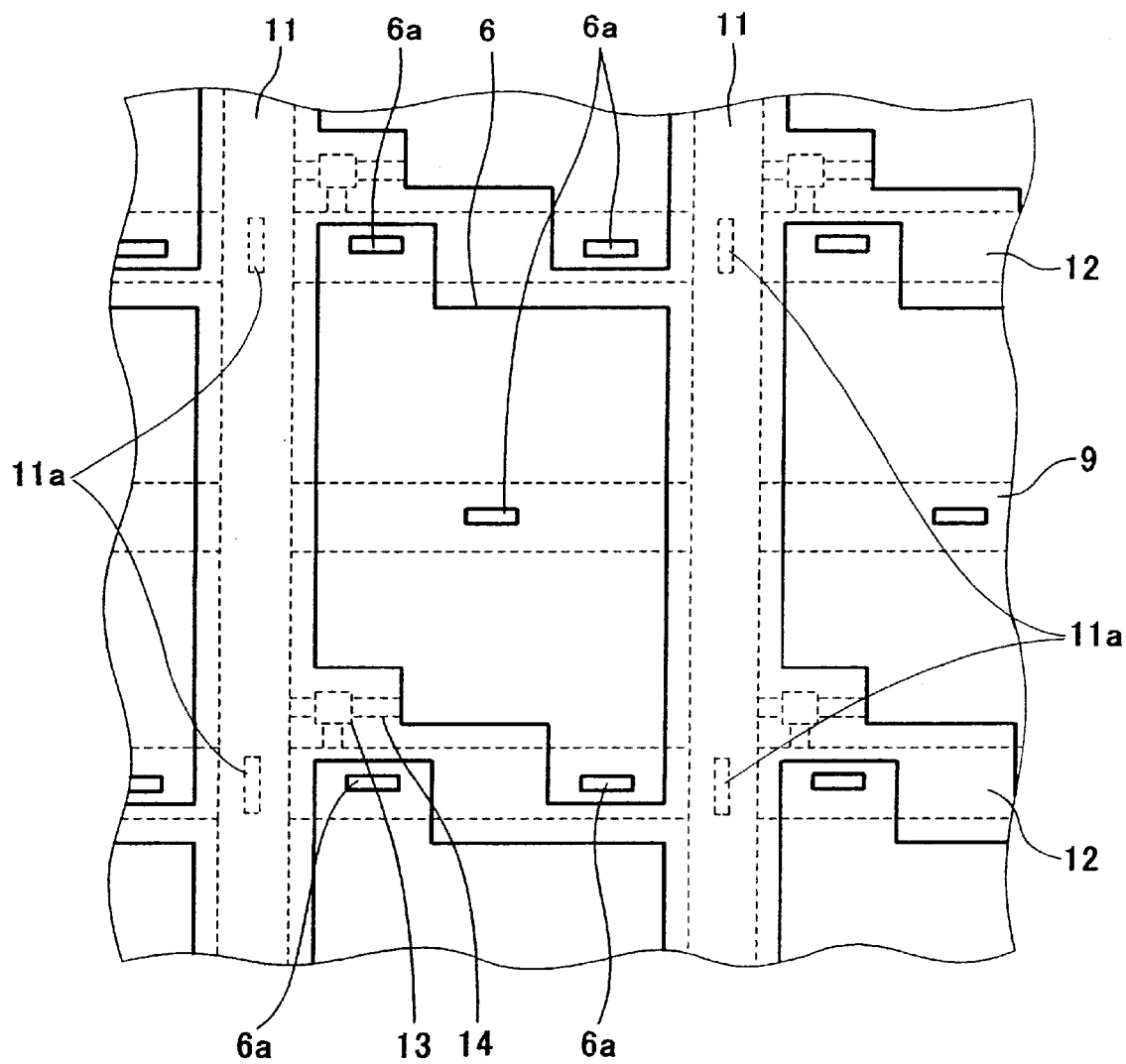
FIG. 19 is a plan view schematically showing a constitution of main elements of a liquid crystal display panel included in a liquid crystal display according to a fourth embodiment of the present invention.

FIG. 19 is a plan view schematically showing a constitution of a liquid crystal display panel included in the liquid crystal display of this embodiment. As shown in FIG. 19, parts of opposite end portions of the pixel electrode 6 are respectively protruded toward the corresponding gate lines 12 so as to overlap with the gate lines 12. The pixel electrode 6 has rectangular apertures 6a provided in regions of the protruded portions which overlap with the gate lines 12. In addition to these apertures 6a, the pixel electrode 6 has a rectangular aperture 6a provided in the region overlapping with the storage capacitor electrode 9, similar to the first embodiment. The pixel electrode 6 overlaps with the gate lines 12 and the storage capacitance electrode 9 with the insulating layer interposed therebetween, similarly to the first embodiment.

The source line 11 overlaps with the gate line 12 with the insulating layer interposed therebetween, and the rectangular aperture 11a is provided in the overlapping region.

Since the other elements are identical to those of the first embodiment, the same or corresponding parts are denoted by the same references, and as such, will not be described.

When the transition voltage of the first embodiment is applied in the liquid crystal display of this embodiment so constituted, the potential difference in the thickness direction of the liquid crystal display panel is increased. Since the pixel electrode 6 has the apertures 6a in the regions overlapping with the gate lines 12 and the storage capacitor electrode 9 with the insulating layer interposed therebetween as described above, the increase in the potential difference in the thickness direction of the liquid crystal display panel causes the strong electric field concentration to occur around the respective apertures 6a. As a result, the liquid crystal molecules around the apertures 6a become the transition nucleus and the spray-bend transition smoothly takes place.

Likewise, when the transition voltage is applied to the source lines 11 and the gate lines 12, the potential difference in the thickness of the liquid crystal display panel is increased. Since the source line 11 has the aperture 11a in the region overlapping with the gate line 12 with the insulating layer interposed therebetween as described above, the increase in the potential difference in the thickness direction of the liquid crystal display panel causes the electric field concentration to occur around the aperture 11a. As a result, the liquid crystal molecules around the aperture 11a become the transition nucleus and the spray-bend transition smoothly takes place.

Similarly to the first embodiment, the width of the aperture 6a and the width of the aperture 11a are respectively set to 4 μm or less. Thereby, stronger field electric field concentration occurs. The apertures 6a, 11a need not be rectangular but may be of shapes of FIGS. 12 through 15.

Thus, in this embodiment, the pixel electrode 6 has the plurality of apertures 6a and the source line 11 has the aperture 11a. Since the liquid crystal molecules around the apertures 6a, 11a become the transition nucleuses, the number of transition nucleuses is greater than that of the first embodiment. Consequently, the spray-bend transition takes place more reliably than that of the first embodiment.

Fifth Embodiment

A fifth embodiment of the present invention illustrates a liquid crystal display capable of reliably performing spray-bend transition by providing cutout portions in the pixel electrode formed on the inner surface of the array substrate.

Figure 20:
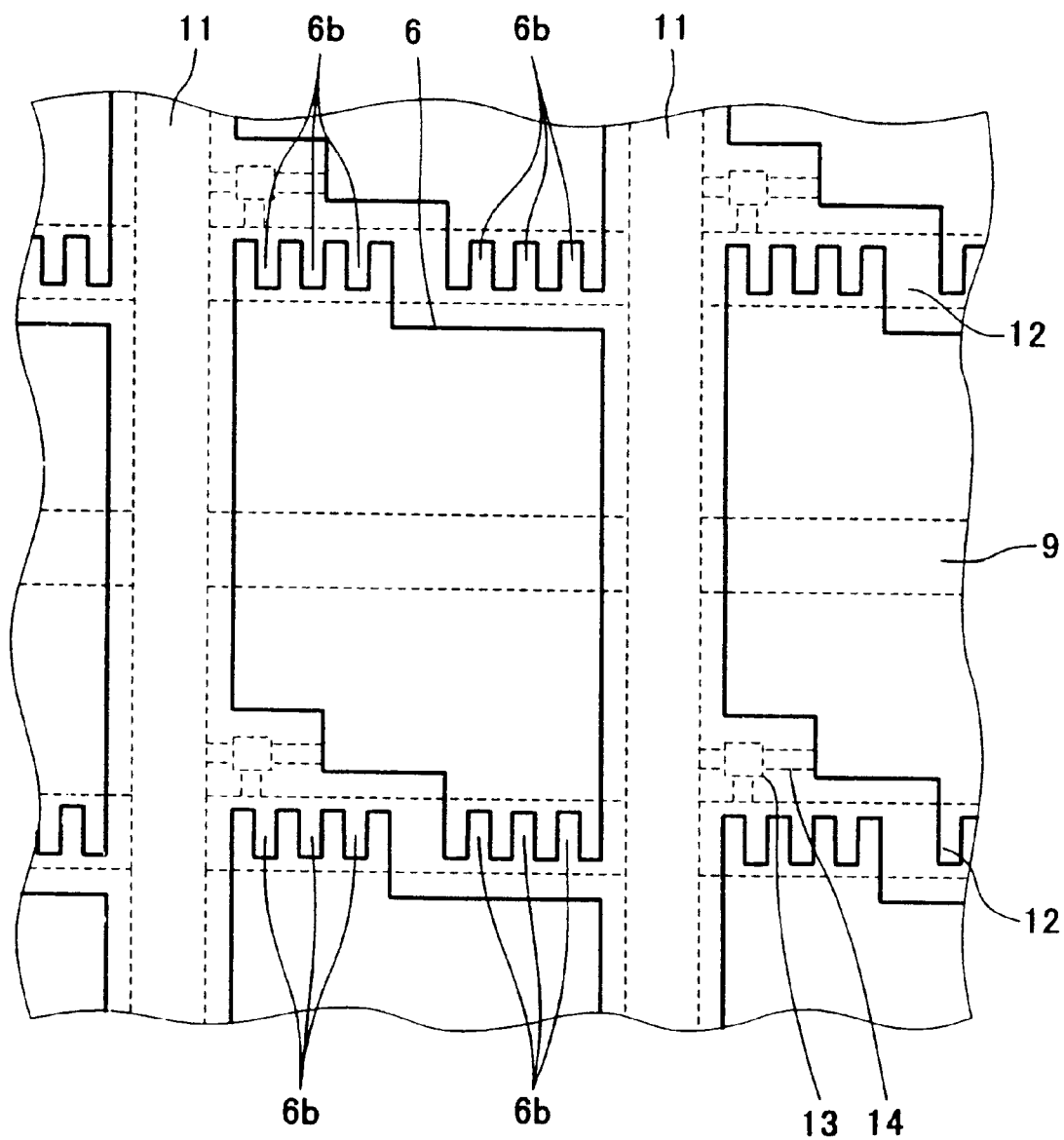
FIG. 20 is a plan view schematically showing a constitution of main elements of a liquid crystal display panel included in a liquid crystal display according to a fifth embodiment of the present invention.

FIG. 20 is a plan view schematically showing a constitution of a liquid crystal display panel included in a liquid crystal display of this embodiment. As shown in FIG. 20, parts of opposite end portions of the pixel electrode 6 are respectively protruded toward the corresponding gate lines 12 so as to overlap with the gate lines 12. A plurality of cutout portions 6b are formed in the regions of the protruded portions which overlap with the gate lines 12. Hence, the protruded portions are comb-shaped. The width of these cutout portions is 4 μm or less.

Since the other elements are identical to those of the first embodiment, the same or corresponding parts are denoted by the same reference numerals and as such will not be described herein.

When the transition voltage of the first embodiment is applied in the liquid crystal display panel so constituted, the potential difference in the thickness direction of the liquid crystal display panel is increased. Since the pixel electrode 6 has the cutout portions 6b in the regions overlapping with the gate lines 12, the increase in the potential difference in the thickness direction of the liquid crystal display panel causes the strong electric field to occur around the respective cutout portions 6b. As a result, the liquid crystal molecules around the cutout portions 6b become the transition nucleuses and the spray-bend transition smoothly takes place.

The pixel electrode 6 may be provided with apertures in the regions overlapping with storage capacitor electrode 9, although such apertures are not provided in this embodiment. Further, similarly to the fourth embodiment, the source line 11 may be provided with the aperture in the region overlapping with the gate line 12.

While the plurality of cutout portions 6b are formed at the end portions of the pixel electrode 6, one aperture may be provided.

Sixth Embodiment

A sixth embodiment of the present invention illustrates a liquid crystal display capable of reliably performing spray-bend transition by providing cutout portions in the storage capacitor electrode and the gate line formed on the inner surface of the array substrate.

Figure 21:
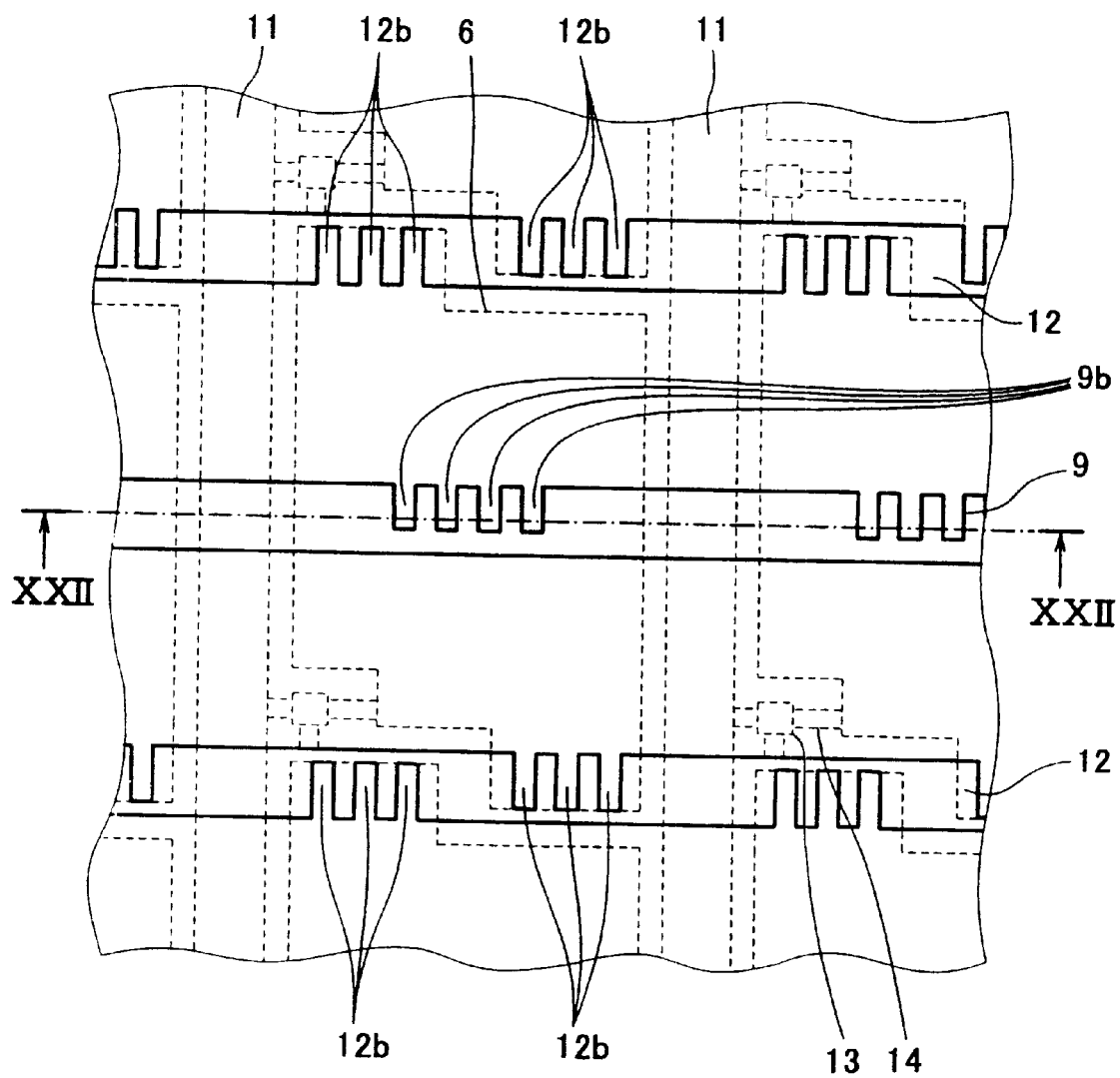
FIG. 21 is a plan view schematically showing a constitution of main elements of a liquid crystal display panel included in a liquid crystal display according to a sixth embodiment of the present invention.
Figure 22:
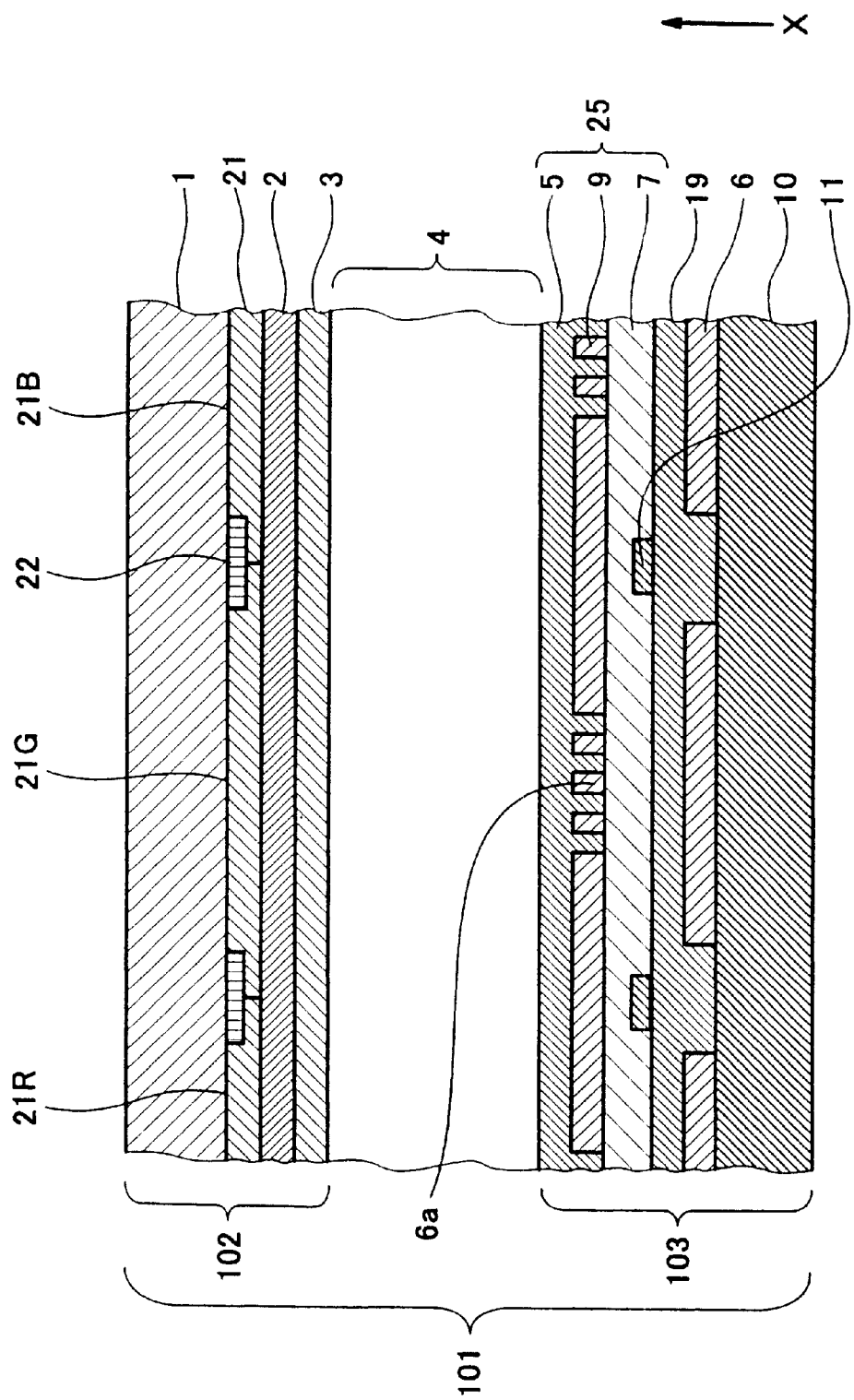
FIG. 22 is a cross-sectional view taken in the direction of arrows substantially along line XXII—XXII of FIG. 21.

FIG. 21 is a plan view schematically showing a constitution of a liquid crystal display panel included in a liquid crystal display of this embodiment. FIG. 22 is a view taken in the direction of arrows substantially along line XXII—XXII of FIG. 20. In FIG. 22, for the sake of convenience, elements provided above the storage capacitor electrode are omitted.

Referring to FIGS. 21, 22, the liquid crystal cell 101 comprises the color filter 102 and the array substrate 103 which are opposed to each other with a spacer (not shown) interposed therebetween. Since the color filter 102 is constituted similarly to that of the first embodiment, the same or corresponding parts are denoted by the same reference numerals, and as such, will not be described herein.

The array substrate 103 has the glass substrate 10. The pixel electrodes 6 are formed on the upper surface of the glass substrate 10 and the insulating layer 19 covers the pixel electrodes 6.

A wiring layer 25 is formed on the upper surface of the insulating layer 19. The wiring layer 25 is comprised of the gate lines 12 and the source lines 11 arranged to cross each other, the storage capacitor electrodes 9, and the insulator for preventing the conduction between these electrodes. To be more detailed, the source lines 11 are formed on the insulating layer 19 and the insulating layer 7 covers the source lines 11. The gate lines 12 and the storage capacitor electrodes 9 are formed on the insulating layer 7 and the alignment layer 5 covers the gate lines 12 and the storage capacitor electrodes 9.

Similarly to the first embodiment, the storage capacitor electrode 9 is placed between the gate lines 12 and the pixel electrode 6 is provided in the pixel region defined by the gate lines 12 and the source lines 11. Therefore, the storage capacitor electrode 9 has the region overlapping with the pixel electrode 6 with the insulating layers 7, 19 interposed therebetween. A plurality of cutout portions 9b are formed in the overlapping region.

Parts of opposite end portions of the pixel electrode 6 are respectively protruded toward the corresponding gate lines 12 so as to overlap with the gate lines 12. The gate lines 12 are provided with a plurality of cutout portions 12b in the regions overlapping with the protruded portion of the pixel electrode 6.

The width of these cutout portions 9b, 12b is 4 μm or less, similarly to the first embodiment.

Since the other elements are identical to those of the first embodiment, the same or corresponding parts are denoted by the same reference numerals, and as such will not be described herein.

When the transition voltage of the first embodiment is applied in the liquid crystal display of this embodiment so constituted, the potential difference in the thickness direction of the liquid crystal display panel is increased. Since the storage capacitor electrode 9 has the cutout portions 9b in the regions overlapping with the pixel electrode 6 and the gate line 12 has the cutout portions 12b, the increase in the potential difference in the thickness direction of the liquid crystal display panel causes the strong electric field concentration to occur around the cutout portions 9b, 12b. As a result, the spray-bend transition smoothly takes place and a satisfactory image display without dot defect is obtained.

While the gate lines 12 and the storage capacitor electrode 9 have the cutout portions only in the regions overlapping with the pixel electrode 6, the cutout portions may be provided in the regions overlapping with the source line 11. Moreover, the cutout portions may be replaced by apertures.

Seventh Embodiment

In the first through sixth embodiments, the apertures or cutout portions are provided in the electrodes formed on the inner surface of the array substrate. On the other hand, a seventh embodiment of the present invention illustrates a liquid crystal display capable of reliably performing spray-bend transition by providing apertures in an auxiliary electrode formed on the inner surface of an opposing substrate (color filter substrate).

Figure 23:
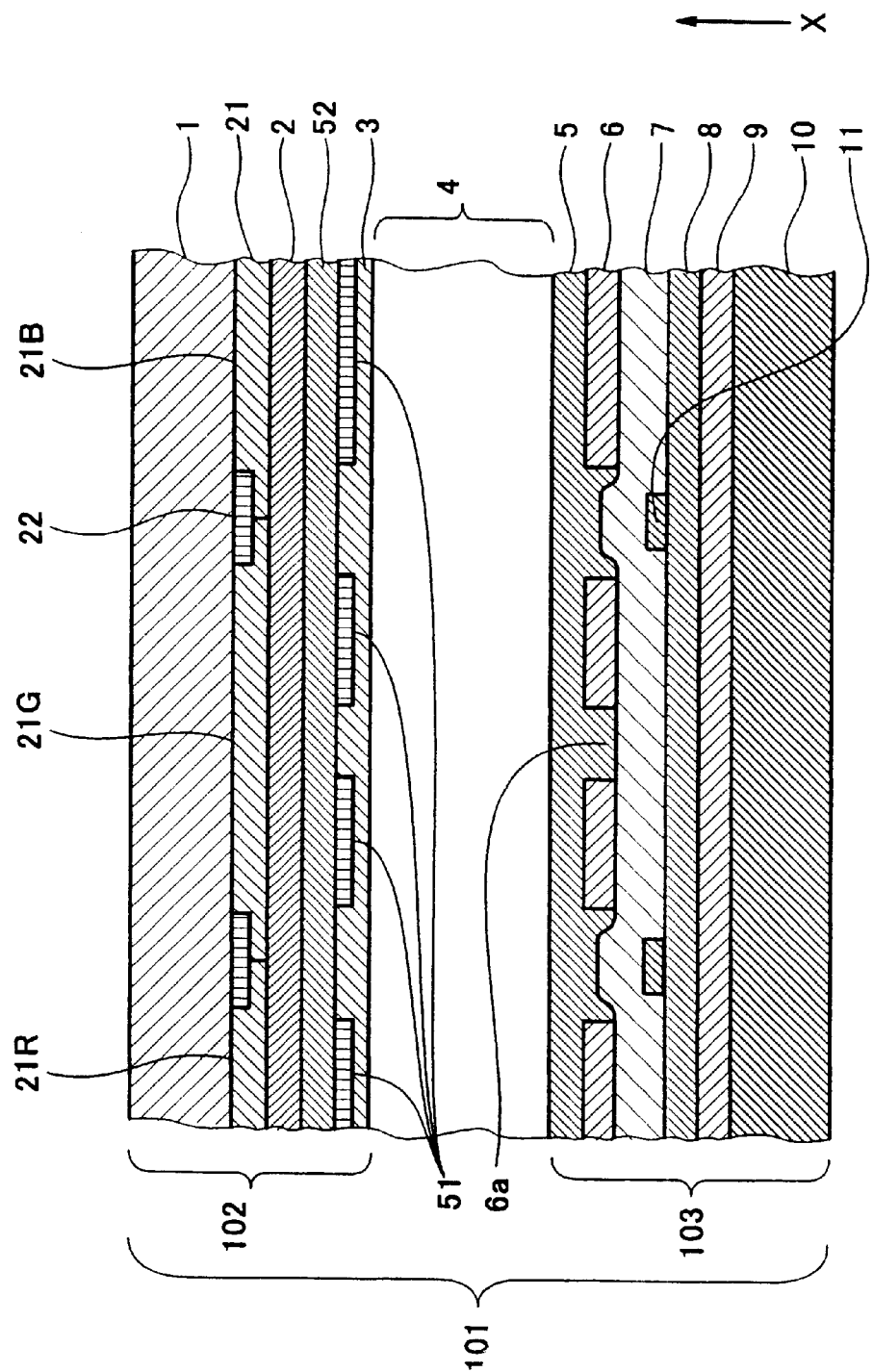
FIG. 23 is a cross-sectional view schematically showing a constitution of main elements of a liquid crystal display panel included in a liquid crystal display according to a seventh embodiment of the present invention.

FIG. 23 is a cross-sectional view schematically showing main elements of a liquid crystal display panel included in a liquid crystal display according to this embodiment. Referring to FIG. 23, the liquid crystal cell 101 comprises the color filter substrate 102 and the array substrate 103 which are opposed to each other with the spacer (not shown) interposed therebetween. Since the array substrate 103 is constituted similarly to that of the first embodiment, the same or corresponding parts are denoted by the same reference numerals, and as such will not be described herein.

Auxiliary electrodes 51 are formed on the lower surface of the counter electrode 2 formed on the inner surface of the color filter substrate 102 with an insulating layer 52 interposed therebetween. The auxiliary electrodes 51 have substantially the same shape as the pixel electrodes 6 formed on the inner surface of the array substrate 103 and are each located in the pixel region defined by the gate lines 12 and the source lines 11, similarly to the pixel electrode 6. The alignment layer 3 covers the auxiliary electrodes 51 and the insulating layer 52.

As described above, since the auxiliary electrodes 51 have substantially the same shape as the pixel electrodes 6 and are provided with a rectangular aperture 51a 4 μm wide or less in the vicinity of the center thereof. The entire surface of the auxiliary electrode 51 overlaps with the counter electrode 2, and hence, the aperture 51a is formed in the region overlapping with the counter electrode 2. The shape of the aperture 51a is not limited to a rectangle but may adopt shapes shown in FIGS. 12 through 15, as described in the first embodiment.

Since the other elements are identical to those of the first embodiment, the same or corresponding parts are denoted by the same reference numerals and as such will not be described herein.

When the transition voltage of the first embodiment is applied in the liquid crystal display of this embodiment so constituted, the potential difference in the thickness direction of the liquid crystal display panel is increased. Since the auxiliary electrode 51 has the aperture 51a in the region overlapping with the counter electrode 2 with the insulator interposed therebetween, the potential difference in the thickness direction of the liquid crystal display panel is increased. In addition, by applying a voltage different from that applied to the counter electrode 2 to the auxiliary electrodes 51, the strong electric field concentration to occur around each of the apertures 51a. As a result, the liquid crystal molecules around the apertures 51a become the transition nucleuses and spray-bend transition smoothly takes place.

Since the auxiliary electrode 51 is provided in each pixel in the liquid crystal display of this embodiment, the transition nucleus is present in each pixel. Consequently, a satisfactory image display without residual spray-aligned pixels is obtained.

Further, by generating the transition nucleuses on the side of the opposing substrate (color filter substrate), more transition nucleuses can be generated. Consequently, the reliability of the spray-bend transition is further improved.

Eighth Embodiment

An eighth embodiment of the present invention illustrates a liquid crystal display capable of reliably performing spray-bend transition by providing protrusions on opposite portions of the array substrate and the opposing substrate.

Figure 24:
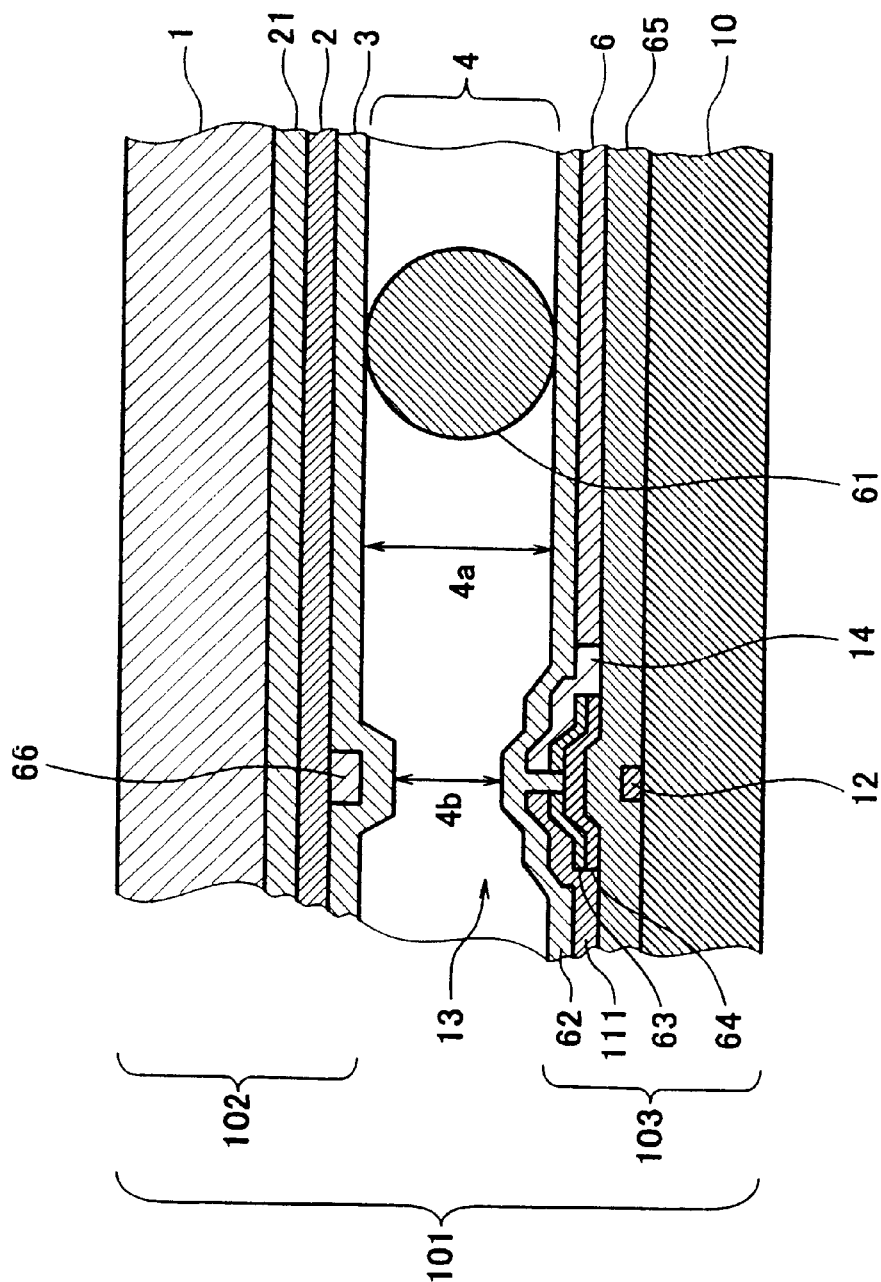
FIG. 24 is a cross-sectional view schematically showing a constitution of main elements of a semiconductor switching device (TFT) portion of a liquid crystal display panel included in a liquid crystal display according to an eighth embodiment of the present invention.

FIG. 24 is a cross-sectional view schematically showing main elements of a semiconductor switching device (TFT) portion of a liquid crystal display panel included in a liquid crystal display of this embodiment. Referring to FIG. 24, the liquid crystal cell 101 comprises the color filter 102 and the array substrate 103 including the semiconductor switching device TFT 13, which are opposed to each other with the spacer (not shown) interposed therebetween.

The array substrate 103 has the glass substrate 10. The gate line 12 is formed on the upper surface of the glass substrate 10 and an insulating layer 65 covers the gate line 12. The TFT 13 and the pixel electrode 6 are formed on the upper surface of the insulating layer 65.

The TFT 13 is provided at a position corresponding to the gate line 12. The TFT 13 is structured such that a $N^+$ a-Si layer 63 is formed on an active semiconductor layer 64 made of amorphous silicon (a-Si). The $N^+$ a-Si layer 63 serves to electrically connect the active semiconductor layer 64, and a source electrode 111 and a drain electrode 14. As defined herein, the source electrode 111 refers to an electrode connected to the source line through which a signal voltage is supplied thereto. The TFT 13 is protected by a protection film 62.

The color filter substrate 102 is structured such that the glass substrate 1, the color filter layer 21, the transparent electrode (counter electrode)2, and the alignment layer 3 are disposed in this order. The color filter layer 21 is composed of red, green, blue color filters and black matrixes at boundaries of these color filters.

A convex portion 66 protruded toward the array substrate 103 is formed on the lower surface of the counter electrode 2 as opposed to the TFT 13. The convex portion 66 is made of epoxy-based photosensitive resin so as to have a suitable size. A cell gap 4b between the color filter substrate 102 with the convex portion 66 and the array substrate 103 with the TFT 13 is smaller than a cell gap 4a between the color filter substrate 102 without the TFT 13 and the array substrate 103 without the convex portion 66.

When the transition voltage of the first embodiment is applied in the liquid crystal display of this embodiment so constituted, the electric field concentration occurs around the cell gap 4b. Thereby, the liquid crystal molecules around the cell gap 4b become transition nucleus and the spray-bend transition reliably takes place. Consequently, a high-quality liquid crystal display capable of providing a satisfactory image without dot defect is obtained.

While a narrow cell gap is formed by using the convex portion 66 of the color filter substrate 102 and the TFT 13 of the array substrate 103, the present invention is not limited to such constitution. As an alternative, the narrow cell gap may be formed by providing a convex portion different from the TFT 13 on the array substrate 103 and another convex portion on the color filter substrate 102 as opposed to the convex portion different from the TFT 13.

Ninth Embodiment

A ninth embodiment of the present invention illustrates a liquid crystal display capable of reliably performing spray-bend transition by providing cutout portions in opposed end portions of adjacent pixel electrodes formed on the inner surface of the array substrate.

Figure 25:
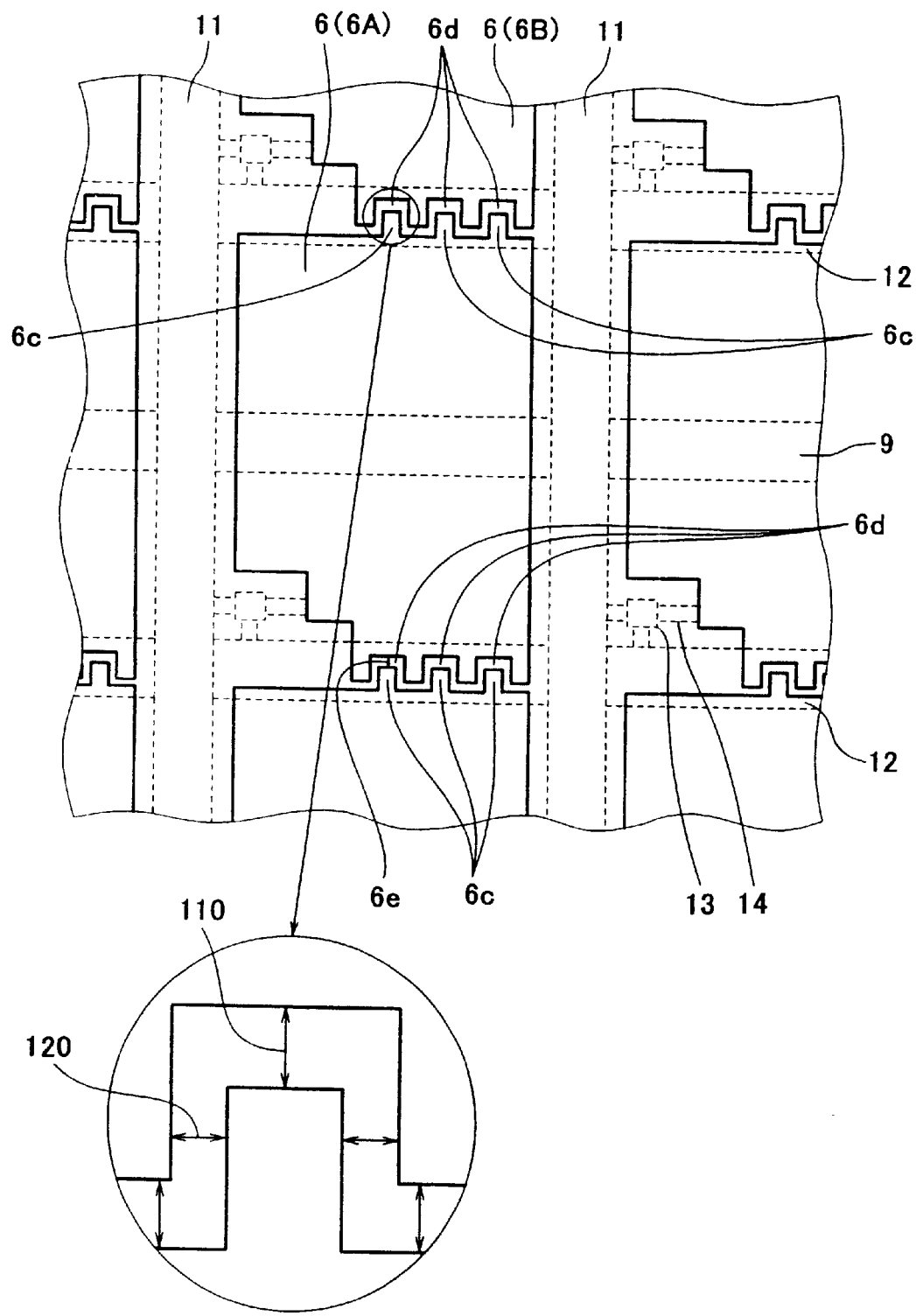
FIG. 25 is a plan view schematically showing a constitution of main elements of a liquid crystal display panel included in a liquid crystal display according to a ninth embodiment of the present invention.

FIG. 25 is a plan view schematically showing a constitution of main elements of a liquid crystal display panel included in a liquid crystal display of this embodiment. Hereinbelow, for the sake of convenience, a pixel electrode 6A and a pixel electrode 6B adjacent to the pixel electrode 6A in the length direction of the source line 11 are discussed.

Referring to FIG. 25, the pixel electrode 6A overlaps with the gate lines 12 at end portions where a plurality of protrusions 6c extended in the length direction of the source line 11 are formed. End portions of the pixel electrode 6B which are opposed to the end portions where the protrusions 6c are provided are protruded toward the gate line 12 so as to overlap with the gate line 12. Recesses 6d corresponding to the plurality of protrusions 6c are formed in the region of the protruded portion of the pixel electrode 6B which overlaps with the gate line 12.

Similarly to the first embodiment, the pixel electrode 6 overlaps with the gate lines 12 with the insulating layer interposed therebetween.

Since the other elements are identical to those of the first embodiment, the same or corresponding parts are denoted by the same reference numerals and as such will not be described herein.

When the transition voltage of the first embodiment is applied in the liquid crystal display of this embodiment so constituted, the potential difference in the thickness direction of the liquid crystal display panel is increased. Since the protrusions 6c and the corresponding recesses 6d overlap with the gate line 12, the electric field concentration occurs between protrusion 6c and the corresponding recess 6d. As a result, the liquid crystal molecules in the region between the protrusions 6c and the recesses 6d become the transition nucleus and the spray-bend transition reliably takes place. Consequently, a high-quality liquid crystal display capable of providing a satisfactory image without dot defect is obtained.

In the ninth embodiment, if the voltages applied to the adjacent pixel electrodes 6A, 6B are reversed in polarity, for example, a plus polarity voltage is applied to the pixel electrode 6A and a minus polarity voltage is applied to the pixel electrode 6B, two-direction transversal electric fields seen in a plan view are generated between the adjacent pixel electrodes 6A, 6B, as indicated by arrows 110, 120. In this state, similarly to the description with reference to FIG. 11, the elastic strain energy of the liquid crystal molecules, and hence the negative energy of the liquid crystal molecules in the region between the pixel electrodes 6A, 6B, are increased. Consequently, the spray-bend alignment smoothly takes place.

To make the electric field generated between the protrusion 6c and the corresponding recess 6d stronger, a distance 6e between the protrusion 6c and the recess 6d may be set as small as possible. Nevertheless, it should be remembered that there is some limitation in reduction of the distance 6e, because if the distance 6e is reduced to excess, shorting might occur between the pixel electrodes 6. Specifically, it is preferable that the distance 6e is approximately 4–8 $\mu$m.

Moreover, the flattening layer may be provided similarly to the second embodiment and the color filter layer may be provided on the side of the array substrate similarly to the third embodiment.

Tenth Embodiment

A tenth embodiment of the present invention illustrates a liquid crystal display capable of reliably performing spray-bend transition by providing an intermediate portion between a main portion and an end portion of the pixel electrode, which differs from the constitution of the ninth embodiment.

Figure 26:
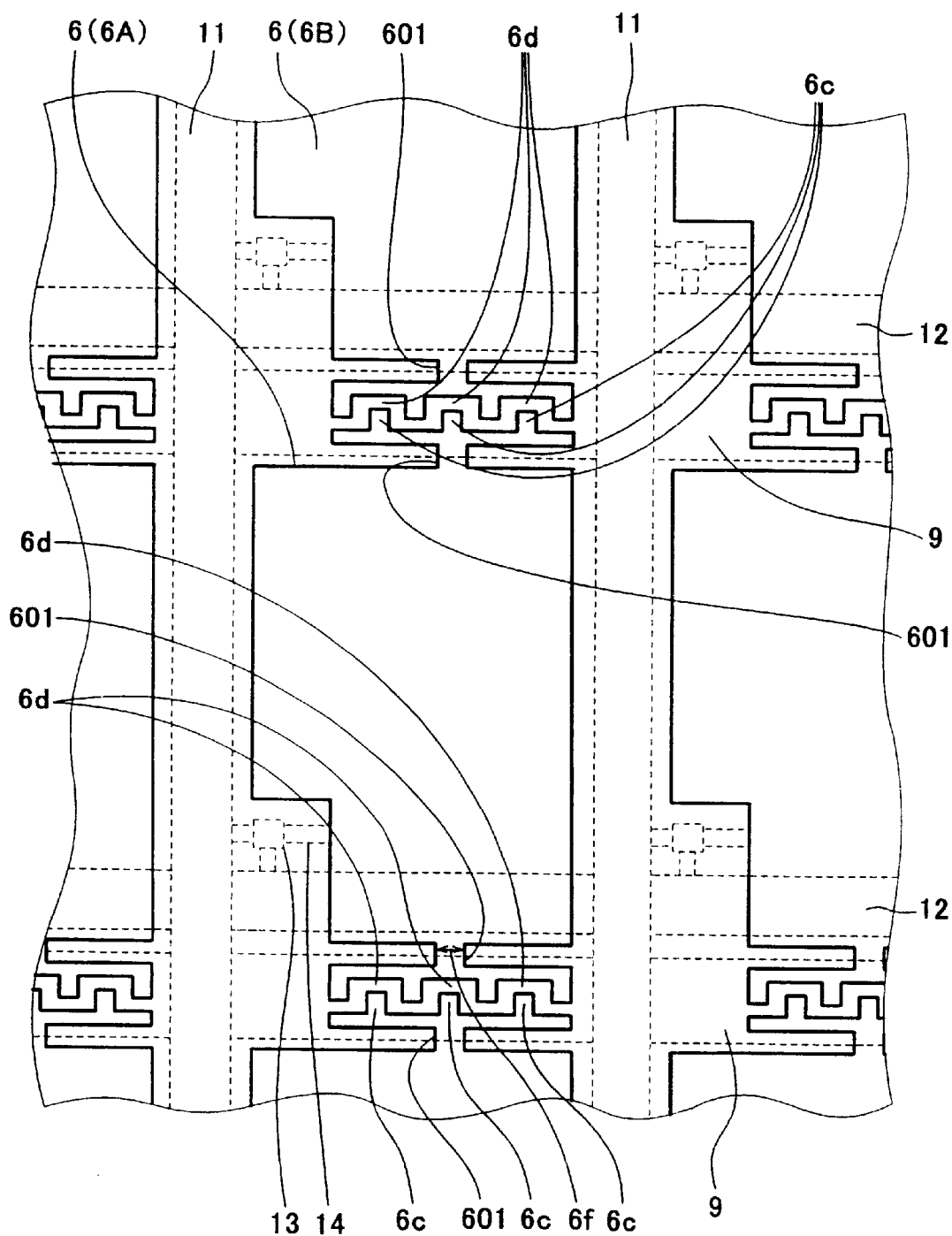
FIG. 26 is a plan view schematically showing a constitution of main elements of a liquid crystal display panel included in a liquid crystal display according to a tenth embodiment of the present invention.

FIG. 26 is a plan view schematically showing a consitution of main elements of a liquid crystal display panel included in a liquid crystal display of this embodiment. Hereinbelow, for the sake of convenience, a pixel electrode 6A and a pixel electrode 6B adjacent to the pixel electrode 6A in the length direction of the source line 11 are discussed.

Referring to FIG. 26, the pixel electrode 6A overlaps with the storage capacitor electrodes 9 at end portions where a plurality of protrusions 6c in the length direction of the source line 11 are formed. End portion of the pixel electrode 6B which is opposed to the end portion where the protrusions 6c are provided are protruded toward the storage capacitor electrode 9 so as to overlap with the storage capacitor electrode 9. Recesses 6d corresponding to the plurality of protrusions 6c are formed in the region of the protruded portion of the pixel electrode 6B which overlap with the storage capacitor electrode 9.

Similarly to the first embodiment, the pixel electrode 6 overlaps with the storage capacitor electrode 9 with the insulating layer interposed therebetween.

The pixel electrode 6 is comprised of a main portion, end portions and intermediate portions 601 each of which is provided between the main portion and each of the end portions. In the pixel electrode 6, the width 60f of the intermediate portions 601 is set smaller than the width of the main portion and the width of the end portions and, specifically set to 10 $\mu$m or less.

Since the other elements are identical to those of the ninth embodiment, the same or corresponding parts are denoted by the same reference numerals and as such will not be described herein.

The storage capacitance formed between the protrusion 6c and the corresponding recess 6d formed at end portion of the pixel electrode 6 varies depending on the width and length of the intermediate portion 601. So, by adjusting the width and length of the intermediate portion 601 depending on the amount of the storage capacitance formed in each pixel, the storage capacitance generated between the protrusion 6c and the recess 6d and the storage capacitance generated by the other elements can be well-balanced.

When the transition voltage of the first embodiment is applied in the liquid crystal display of this embodiment so constituted, the electric field concentration occurs between the protrusion 6c and the corresponding recess 6d, similarly to the ninth embodiment. As a result, the liquid crystal molecules around the region between the protrusion 6c and the recess 6d become the transition nucleus and the spray-bend transition reliably takes place. Consequently, a high-quality liquid crystal display capable of providing a satisfactory image without dot defect is obtained.

Eleventh Embodiment

An eleventh embodiment of the present invention illustrates a liquid crystal display capable of reliably performing spray-bend transition by providing apertures in the counter electrode formed on the inner surface of the opposing substrate.

Figure 27:
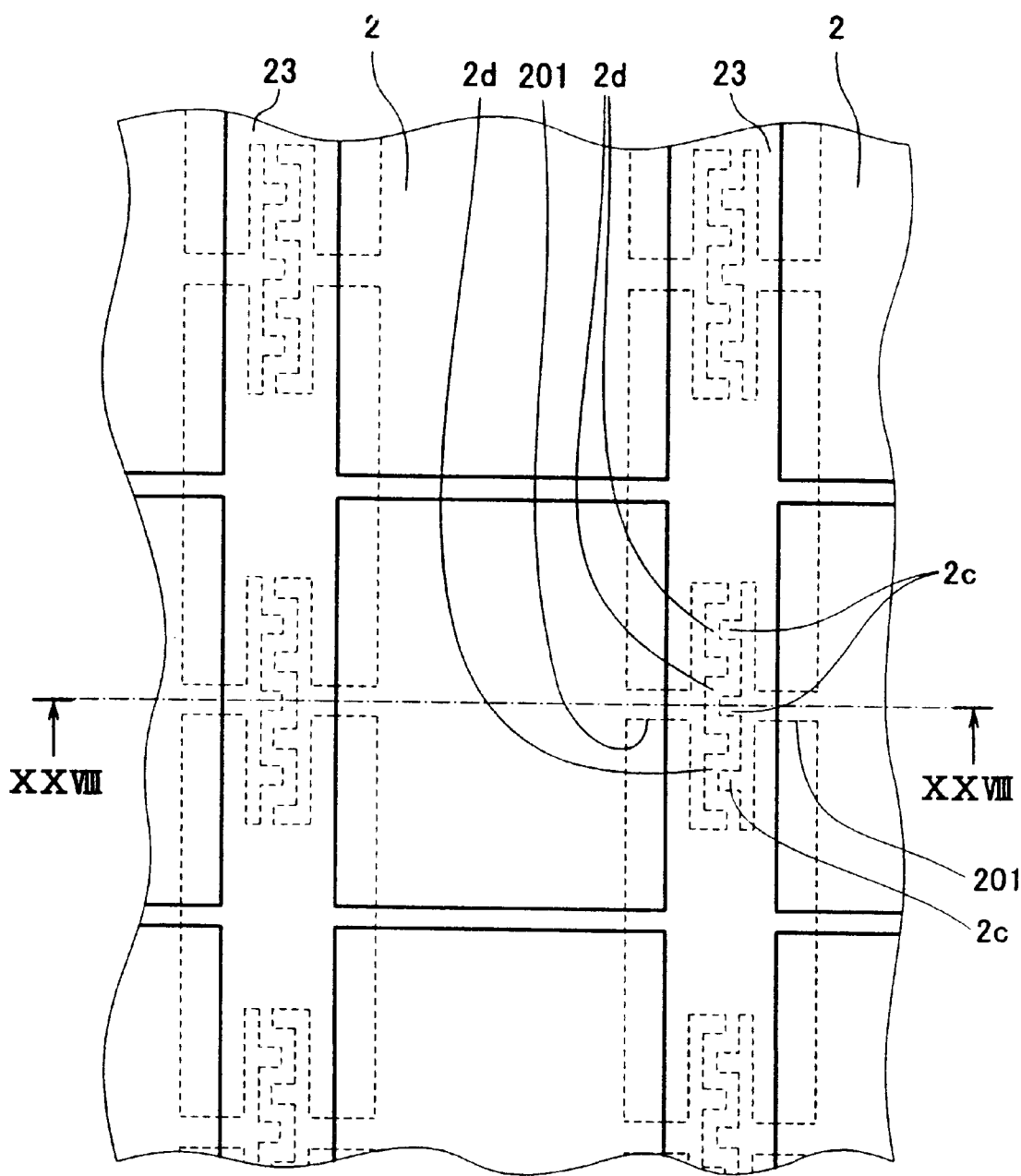
FIG. 27 is a plan view schematically showing a constitution of main elements of a liquid crystal display panel included in a liquid crystal display according to an eleventh embodiment of the present invention.
Figure 28:
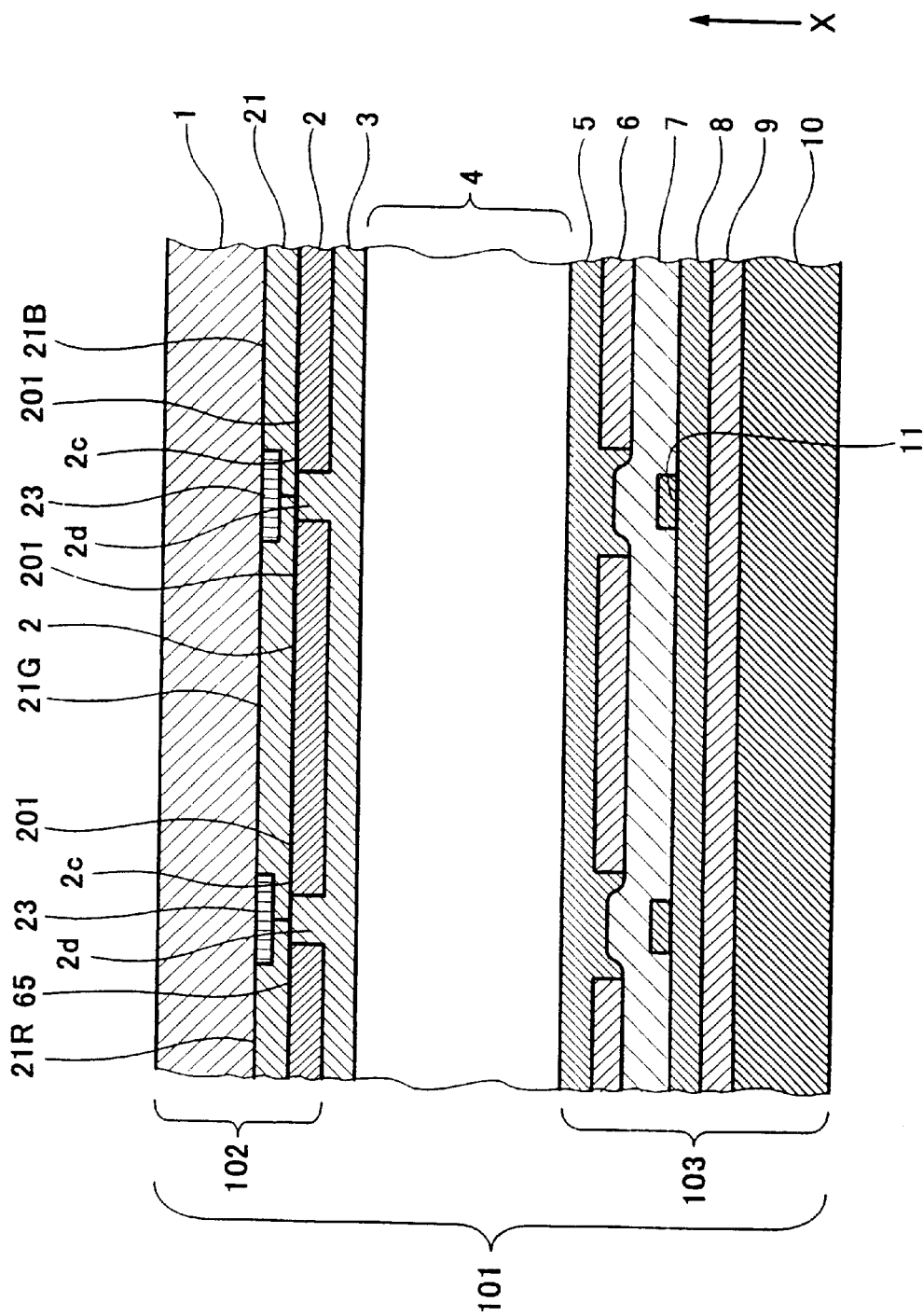
FIG. 28 is a cross-sectional view taken in the direction of arrows substantially along line XXVIII—XXVIII of FIG. 27.

FIG. 27 is a plan view schematically showing a constitution of main elements of a liquid crystal display panel included in a liquid crystal display of this embodiment. FIG. 28 is a cross-sectional view taken in the direction of arrows substantially along line XXVIII—XXVIII of FIG. 27. FIG. 27 shows the positional relationship between the black matrix 22 and the counter electrode 2 and the other elements are omitted.

Referring to FIGS. 27, 28, the liquid crystal cell 101 comprises the color filter 102 and the array substrate 103 which are opposed to each other with the spacer (not shown) interposed therebetween. Since the array substrate 103 is constituted similarly to that of the first embodiment, the same or corresponding parts are denoted by the same reference numerals, and as such will not be described herein.

The color filter substrate 102 has the glass substrate 1. A color filter layer 21 is formed on the lower surface of the glass substrate 1. Specifically, the red color filter 21R, the green color filter 21G, and the blue color filter 21B are formed and conductive black matrixes 23 are formed at boundaries of these color filters.

The counter electrode 2 and the alignment layer 3 are formed on the lower surface of the color filter layer 21. The counter electrode 2 is divided for every pixel line to apply the voltage for every pixel line and the conductive black matrix 23 is placed so as to overlap with the gap between the adjacent counter electrodes 2. Hereinafter, for the sake of convenience, a counter electrode 2A and a counter electrode 2B adjacent to the counter electrode 2A in the length direction of the gate line (not shown) are discussed.

Part of the counter electrode 2A is protruded toward the counter electrode 2B for every pixel and the protruded portion has a shape similar to that of the end portion of the pixel electrode 6 of the tenth embodiment. More specifically, the protruded portion has a plurality of protrusions 2c extended toward the length direction of the gate line. Part of the counter electrode 2B is protruded toward the counter electrode 2A for every pixel as opposed to the protruded portion where the protrusions 2c are provided. The protruded portion of the counter electrode 2B has recesses 2d corresponding to the protrusions 2c. These protruded portions and the mains portions of the counter electrodes 2A, 2B are connected by means of the intermediate portions 201.

In this embodiment, the color filter layer 21 functions as the insulator between the counter electrode 2 and the black matrix 23.

When the transition voltage of the first embodiment is applied in the liquid crystal display of this embodiment so constituted, and simultaneously, the transition voltage different from that applied to the counter electrode 2 is applied to the black matrix 23, the electric field concentration occurs between the protrusion 2c and the corresponding recess 2d. Thereby, the liquid crystal molecules around the region between the protrusion 2c and the corresponding recess 2d become transition nucleus and the spray-bend transition reliably takes place. Consequently, a high-quality liquid crystal display capable of providing a satisfactory image without dot defect is obtained.

By thus generating the transition nucleuses on the side of the opposing substrate (color filter substrate), more transition nucleuses are generated as compared to the case where the transition nucleuses are generated only on the side of the array substrate. Consequently, reliability of the spray-bend transition is further improved.

Twelfth Embodiment

A twelfth embodiment of the present invention illustrates a liquid crystal display in which the shape of end portions of the pixel electrode is different from that of the tenth embodiment.

Figure 29:
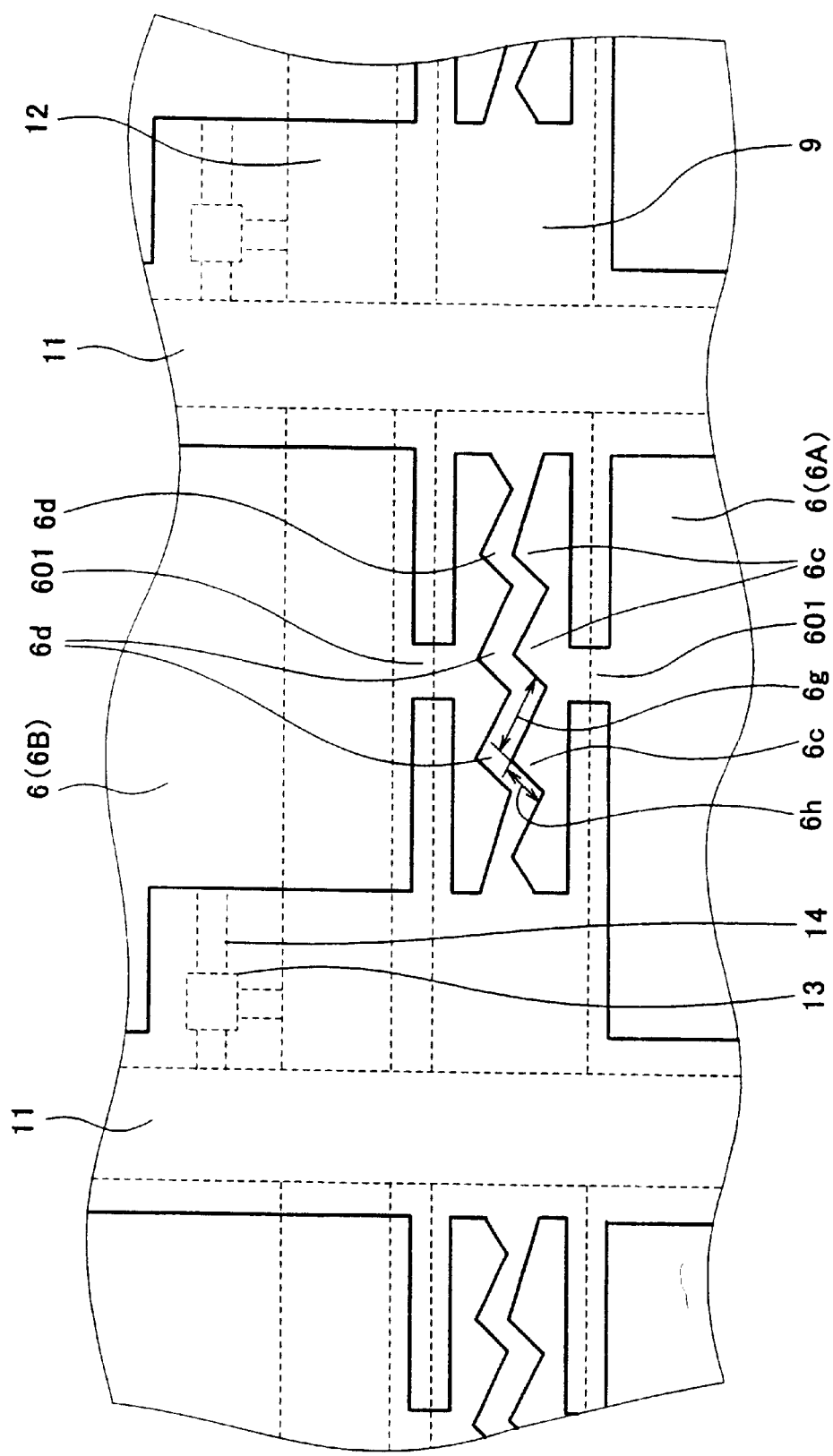
FIG. 29 is a plan view schematically showing a constitution of main elements of a liquid crystal display panel included in a liquid crystal display according to a twelfth embodiment of the present invention.

FIG. 29 is a plan view schematically showing a constitution of main elements of a liquid crystal display panel included in a liquid crystal display of this embodiment. As shown in FIG. 29, similarly to the tenth embodiment, the pixel electrode 6 is comprised of a main portion, end portions, and intermediate portions 601 each of which is provided between the main portion and each of the end portions. The width of the intermediate portion 601 is set smaller than the width of the main portion and the width of the end portions. Hereinbelow, for the sake of convenience, the pixel electrode 6A and the pixel electrode 6B adjacent to the pixel electrode 6A in the length direction of the source line 11 are discussed.

The pixel electrode 6A overlaps with the storage capacitor electrode 9 at end portion where a plurality of protrusions 6c extended in the length direction of the source line 11 are formed. The protrusions 6c are saw-tooth shaped and long sides 6g and short sides 6h of the protrusions 6c respectively make predetermined angles with respect to the length direction of the gate line 12.

End portion of the pixel electrode 6B which is opposed to the end portion of the pixel electrode 5A where the protrusions 6c are provided is protruded toward the storage capacitor electrode 9 so as to overlap with the storage capacitor electrode 9. The recesses 6d corresponding to the plurality of protrusions 6c are formed in the region of the protruded portion of the pixel electrode 6B which overlap with the storage capacitor electrode 9.

Similarly to the first embodiment, the pixel electrode 6 overlaps with the storage capacitor electrode 9 with the insulating layer interposed therebetween.

Since the other elements are identical to those of the ninth embodiment, the same or corresponding parts are denoted by the same reference numerals and as such will not be described herein.

When the direction in which the long side 6g or the short side 6h of the protrusion 6c extends coincides with the direction of alignment treatment performed on the alignment layer, the strongest electric field is generated in the liquid crystal layer. It is therefore desirable that the direction in which the long side 6g or the short side 6h extends conforms to the direction of the alignment treatment. Thereby, stronger electric field can be generated and consequently the spray-bend transition more reliably takes place.

In some cases, by varying the viewing angle characteristic depending on the position in a display screen, satisfactory image display as a whole is achieved. In such cases, the viewing angle characteristic is often varied by changing the direction of the alignment treatment depending on the position in the display screen. Therefore, the direction in which the long side 6g or the short side 6h of the protrusion 6c extends may be varied for every pixel to be adapted to the change in the direction of alignment treatment.

Thirteenth Embodiment

A thirteenth embodiment illustrates a liquid crystal display in which the shape of end portions of the pixel electrode is different from that of the tenth embodiment.

Figure 30:
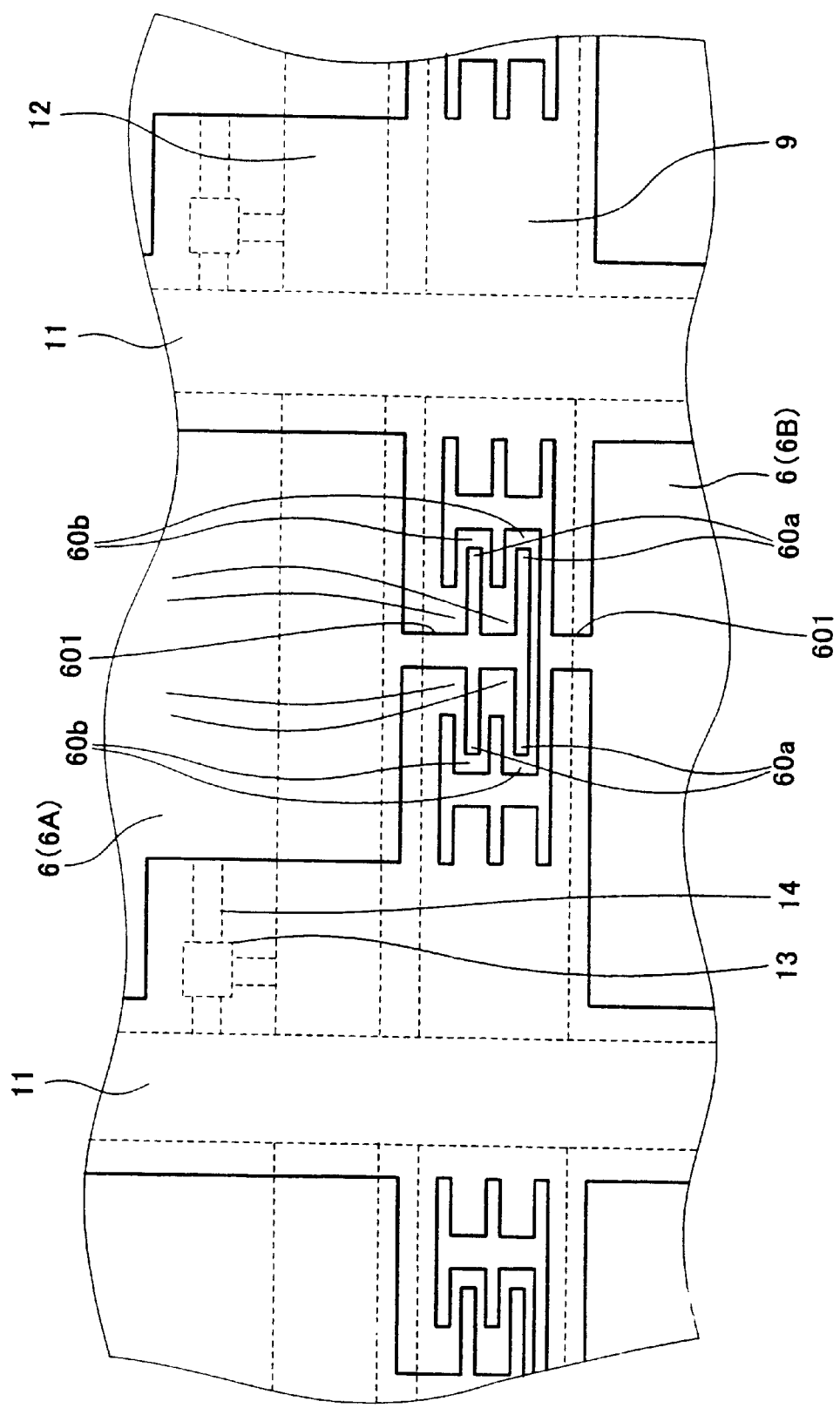
FIG. 30 is a plan view schematically showing a constitution of main elements of a liquid crystal display panel included in a liquid crystal display according to a thirteenth embodiment of the present invention.

FIG. 30 is a plan view schematically showing a constitution of main elements of a liquid crystal display panel included in a liquid crystal display of this embodiment. As shown in FIG. 30, similarly to the tenth embodiment, the pixel electrode 6 is comprised of a main portion, end portions, and intermediate portions 601 each of which is provided between the main portion and each of the end portions. The width of the intermediate portion 601 is set smaller than the width of the main portion and the width of the end portions. Hereinbelow, for the sake of convenience, the pixel electrode 6A and the pixel electrode 6B adjacent to the pixel electrode 6A in the length direction of the source line 11 are discussed.

The pixel electrode 6A has portion protruded toward the storage capacitor electrode 9 such that the protruded portion overlaps with the storage capacitor electrode 9. A plurality of protrusions 60a are formed in the region overlapping with the storage capacitor electrode 9 so as to extend in the length direction of the storage capacitor electrode 9.

End portion of the pixel electrode 6B which is opposed to the end portion of the pixel electrode 6A where the protrusions 60a are provided is protruded toward the storage capacitor electrode 9 so as to overlap with the storage capacitor electrode 9. Recesses 60b corresponding to the plurality of protrusions 60a are formed in the region of the protruded portion of the pixel electrode 6B which overlap with the storage capacitor electrode 9.

Similarly to the first embodiment, the pixel electrode 6 overlaps with the storage capacitor electrode 9 with the insulating layer interposed therebetween.

Since the other elements are identical to those of the ninth embodiment, the same or corresponding parts are denoted by the same reference numerals and as such will not be described herein.

When the transition voltage of the first embodiment is applied in the liquid crystal display of this embodiment so constituted, the electric field concentration occurs between the protrusion 60a and the corresponding recess 60b, similarly to the ninth embodiment. As a result, the liquid crystal molecules around a region between the protrusion 60a and the corresponding recess 60b become the transition nucleus and the spray-bend transition reliably takes place. Consequently, a high-quality liquid crystal display capable of providing a satisfactory image without dot defect is obtained.

Fourteenth Embodiment

A fourteenth embodiment of the present invention illustrates a liquid crystal display that employs a field sequential color method and is capable of reliably performing spray-bend transition.

Figure 31:
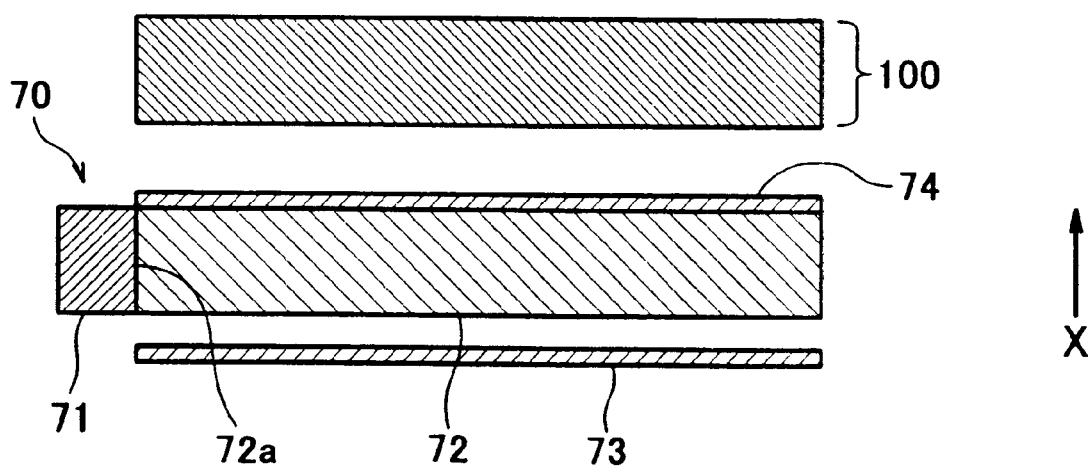
FIG. 31 is a cross-sectional view schematically showing a constitution of a liquid crystal display according to a fourteenth embodiment of the present invention.

FIG. 31 is a cross-sectional view schematically showing a constitution of a liquid crystal display according to this embodiment. Referring to FIG. 31, the liquid crystal display of this embodiment comprises a liquid crystal display panel 100, which is one of the liquid crystal display panels described in the first through thirteenth embodiments, and a backlight 70 placed below the liquid crystal display panel 100.

The backlight 70 comprises a light guiding plate 72 comprised of transparent rectangular synthetic resin plate, a light source 71 placed in the vicinity of an end face 72a of the light guiding plate 72 as opposed to the end face 72a, a reflector 73 placed below the light guiding plate 72, and a light diffusing sheet 74 provided on an upper surface of the light guiding plate 72.

The light source 71 is a LED array in which LEDs (light emitting diodes) for emitting light of three primary colors— red, green, and blue, are sequentially and repeatedly arranged.

In the backlight 70 so constituted, the light emitted from the light source 71 is incident on the light guiding plate 72 through the end face 72a. The incident light is multiple-scattered inside of the light guiding plate 72 and emanates from the entire upper surface thereof. In this case, the light leaking downward from the light guiding plate 72 and incident on the reflector 73 is reflected by the reflector 73 and returned to the inside of the light guiding plate 72. The light emanating from the light guiding plate 72 is diffused by the light diffusing sheet 74 and the resulting diffused light is incident on the liquid crystal display panel 100. Thereby, the liquid crystal display panel 100 is entirely and uniformly irradiated with red, green, or blue light.

In the liquid crystal display panel of this embodiment so constituted, a control circuit (not shown) outputs a control signal to the backlight 70 to cause the LEDs as the light source of the backlight 70 to sequentially emit light of red, green, and blue in a predetermined cycle. To perform display in synchronization with the emission of light, the control circuit outputs a control signal to a gate driver (not shown) and a source driver (not shown), in accordance with the image signal externally input. As a result, the gate driver applies a scanning signal voltage to the gate lines, thereby causing the TFTs of the respective pixels to be sequentially turned on, and according to this timing, the source driver sequentially applies an image signal voltage to the pixel electrodes of the respective pixels through the source lines. Thereby, the liquid crystal molecules are modulated and light transmittance of light emitted from the backlight 70 changes. As a result, an image according to the image signal is presented to a viewer who is observing the liquid crystal display.

As described above, the liquid crystal display of this embodiment employs so-called field sequential color method. In case of the liquid crystal display by the field sequential color method, since one frame period is divided into a plurality of sub-frame periods in display, a satisfactory image display is not obtained if the response of the liquid crystal display panel is slow. On the other hand, since the liquid crystal display of this embodiment comprises the OCB-mode liquid crystal display panel 100 capable of high-speed response, a satisfactory image display can be achieved by the field sequential color method.

As thus far described, the liquid crystal display panels illustrated in the first to thirteenth embodiments are capable of reliably performing spray-bend transition. Therefore, in the liquid crystal displays of these embodiments, a satisfactory image display without a dot defect is obtained.

Fifteenth Embodiment

A fifteenth embodiment of the present invention illustrates a liquid crystal display capable of reliably performing spray-bend transition by providing the source electrode so as to overlap with the gate line. Since the constitution of the liquid crystal display of this embodiment is identical to that of the first embodiment except the structure of the pixel described with reference to FIG. 32, description thereof is omitted.

Figure 32:
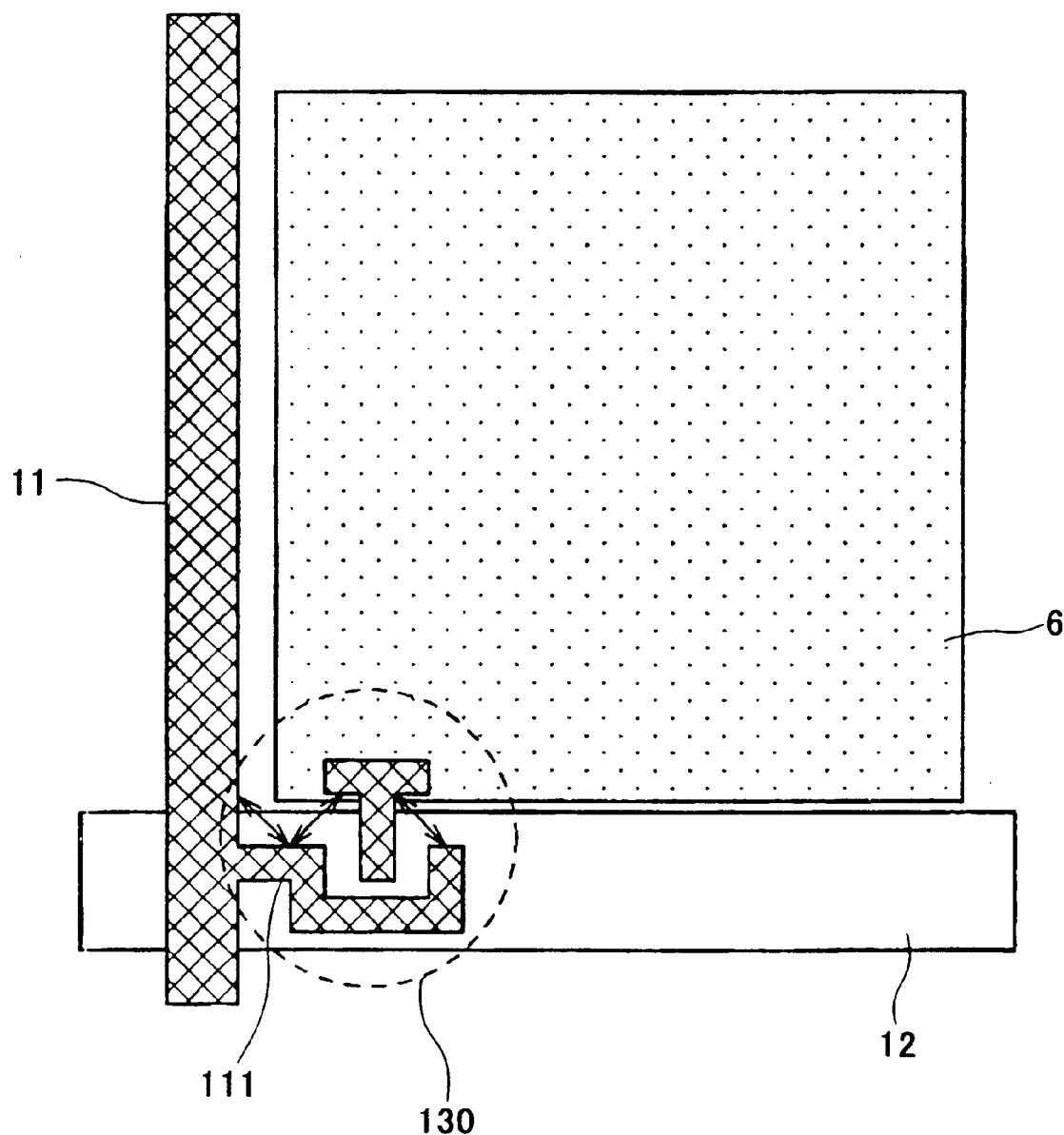
FIG. 32 is a plan view schematically showing a structure of a pixel included in the liquid crystal display according to a fifteenth embodiment of the present invention.

FIG. 32 is a plan view schematically showing a constitution of a structure of a pixel in the liquid crystal display of this embodiment. As shown in FIG. 32, the pixel is connected to the source line 11 provided with a source electrode 111 to which a signal voltage is to be supplied through the source line 11. The source electrode 111 extends in the length direction of the gate line 12 and overlaps with the gate line 12 with an insulator (not shown) interposed therebetween. The signal voltage is supplied to the source electrode 111 and then to the pixel electrode through a drain electrode. A liquid crystal layer (not shown) is disposed above the source line 11. That is, the source electrode 111 is interposed between the gate line 12 and the liquid crystal layer.

The source electrode 111 has a bent portion in a region thereof overlapping with the gate line 12. When a transition voltage described later is applied in the liquid crystal display of this embodiment so constituted, the electric field concentration occurs between the bent portion of the source electrode 111 and the pixel electrode 6. As a result, liquid crystal molecules around a region between the bent portion and the pixel electrode 6 become transition nucleus and the spray-bend transition reliably takes place.

Subsequently, waveforms of the transition voltage in the liquid crystal display of this embodiment and a method for applying the transition voltage will be explained.

Figure 33:
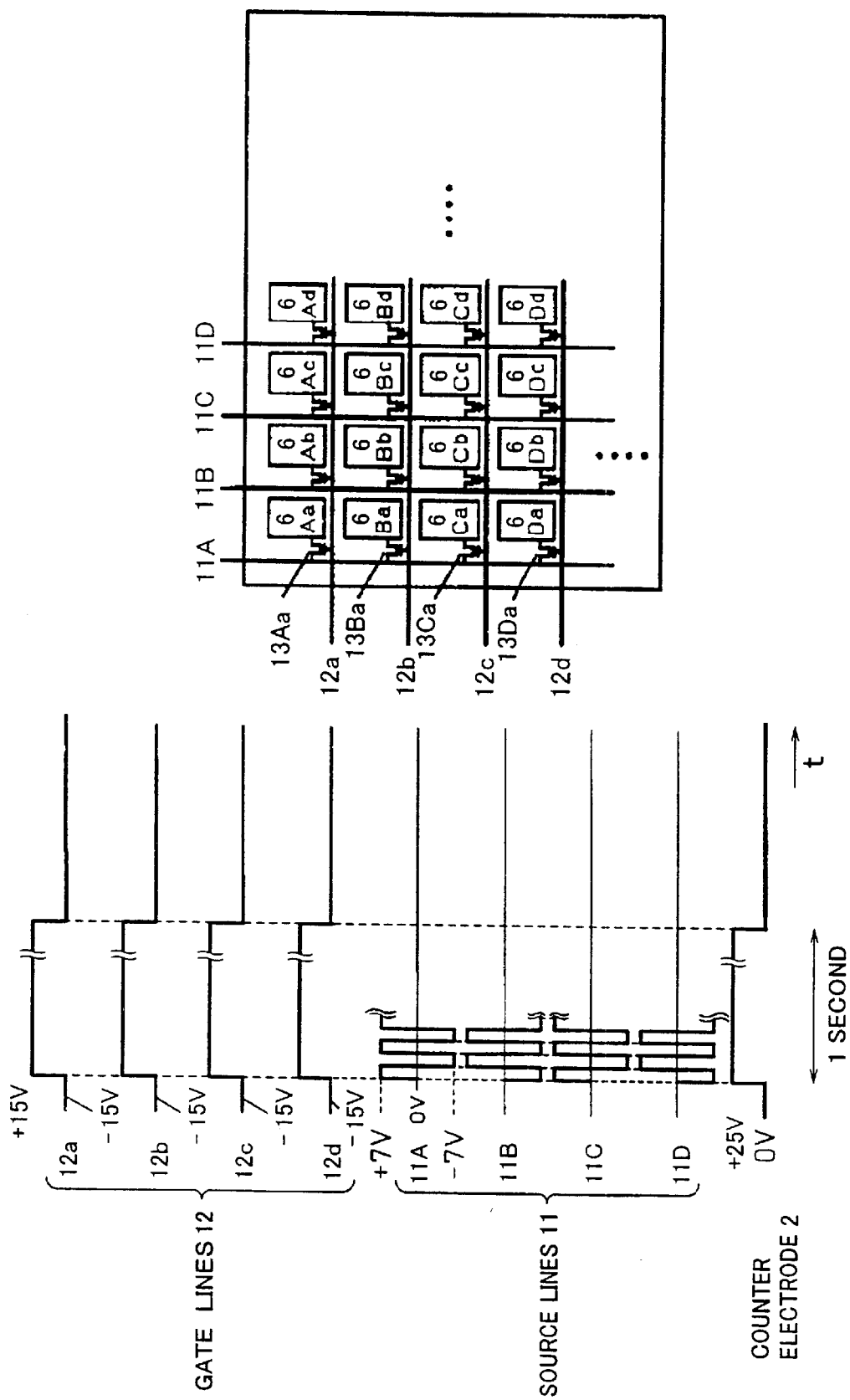
FIG. 33 is a view showing an example of waveforms of a transition voltage in a liquid crystal display according to a fifteenth embodiment of the present invention.

FIG. 33 is a view showing waveforms of the transition voltage in the liquid crystal display of this embodiment. In the liquid crystal display of this embodiment, as show in FIG. 33, +15 V voltage as a gate-on potential is applied to respective gate lines 12*a*, 12*b*, 12*c* . . . for one second. Likewise, +25 V voltage is applied to the counter electrode 2 for one second. During this application, an AC rectangular wave voltage is applied to the source lines 11 at +7 V and 30 Hz (field frequency), and in a duty ratio of 0.5:1. More specifically, similarly to the first embodiment, the voltage is applied to the source lines 11 in such a manner that the AC rectangular wave voltage applied to the pixel electrode 6A*a*, 6C*c*, . . . , through source lines 11A, 11C . . . on odd columns and the AC rectangular wave voltage applied to the pixel electrodes 6B*b*, 6D*d* . . . through the source lines 11B, 11D . . . on even columns are reversed in polarity.

As the result of the application of the transition voltage, the spray-bend transition can uniformly take place in a comparatively large-sized liquid crystal display. This is due to the fact that the AC voltage applied to the liquid crystal causes unstable "disturbance", thereby resulting in improved uniformity. The field frequency of the transition voltage is not limited 30 Hz. According to study by inventors or the like, it is desirable that the frequency is 1 kHz or less.

Figure 34:
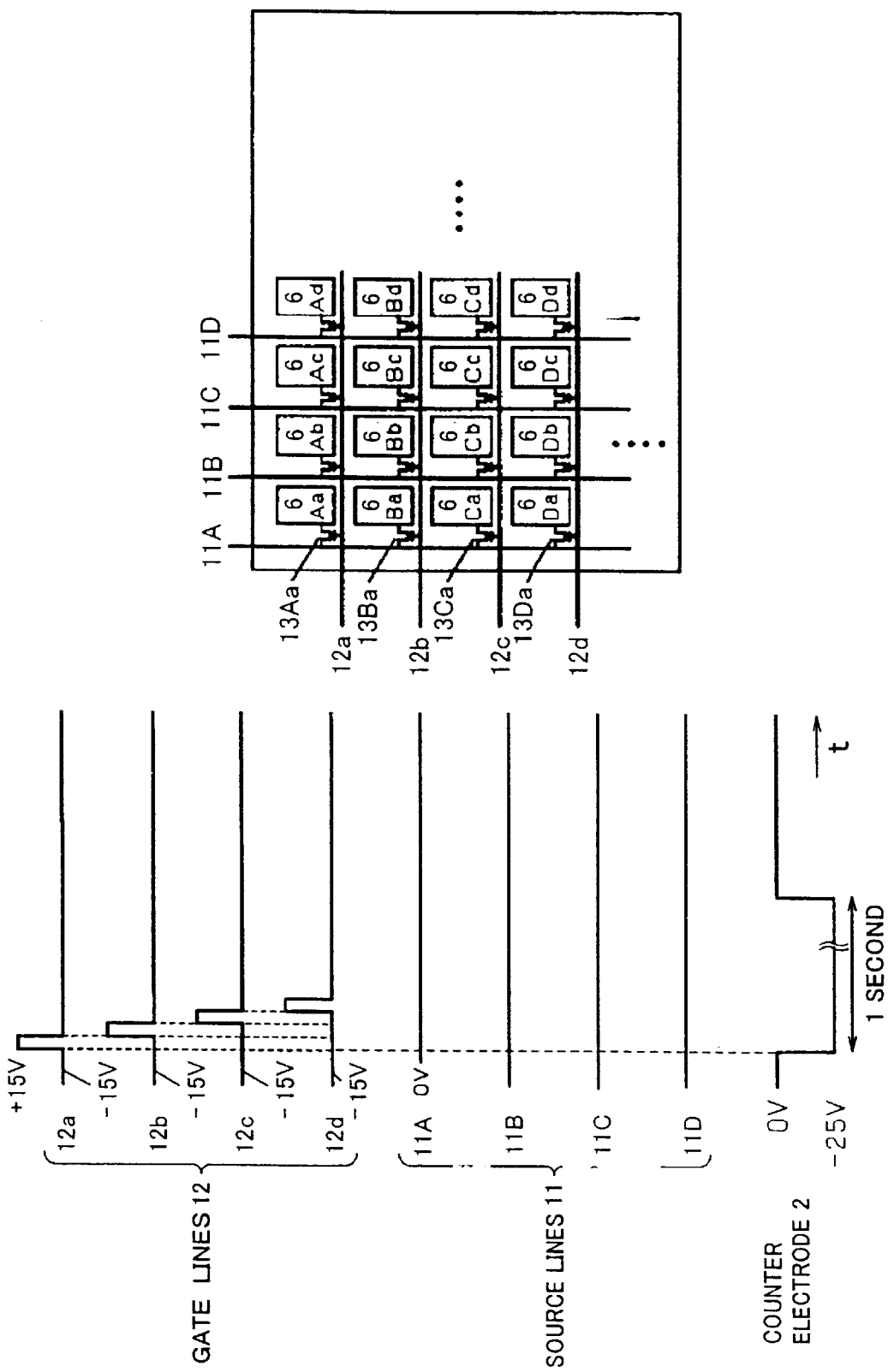
FIG. 34 is a view showing another example of the waveforms of the transition voltage in the liquid crystal display according to the fifteenth embodiment.

As an alternative, transition voltage of waveforms shown in FIG. 34 may be employed. In that case, differently from the case of FIG. 33, no voltage is applied to the pixel electrode 6 by keeping the source line 11 at potential of 0 V and −25 V voltage is applied to the counter electrode 2 for one second. Since the potential of the source line 11 is kept at 0 V and is not fluctuated, application of the transition voltage is easily carried out without depending on the source driver. Also in that case, the spray-bend transition reliably takes place similarly to the case using the transition voltage of the waveforms of FIG. 33. In actuality, however, slight nonuniformity of spray-bend transition is observed in the plane and the voltage required for generating the spray-bend transition is approximately 2 to 3 V higher as compared to the case of FIG. 33.

By the way, the inventors or the like found that the spray-bend transition is facilitated when the potential applied to the counter electrode 2 and the gate-on potential have the same polarity as compared to the case using voltages of different polarities (e.g., −25 V voltage is applied to the counter electrode 2 and +15 V is applied to the gate line 12 as the gate-on potential). This might be due to the fact that the transversal electric field generated using the voltages of the same polarity is stronger than that generated using the voltages of different polarities and the spray-bend transition is thereby facilitated.

Figure 35:
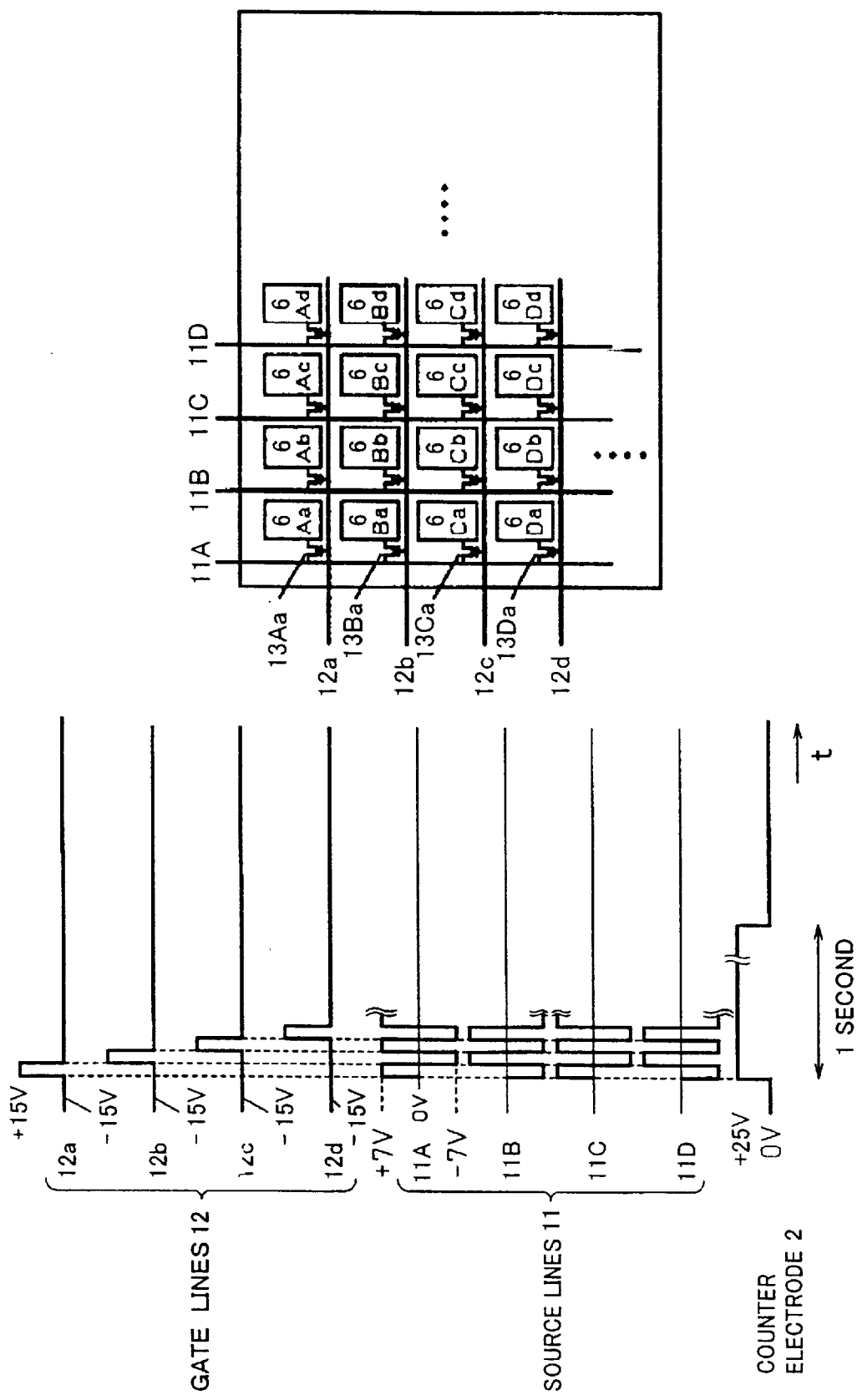
FIG. 35 is a view showing a further example of the waveforms of the transition voltage in the liquid crystal display according to the fifteenth embodiment.
Figure 36:
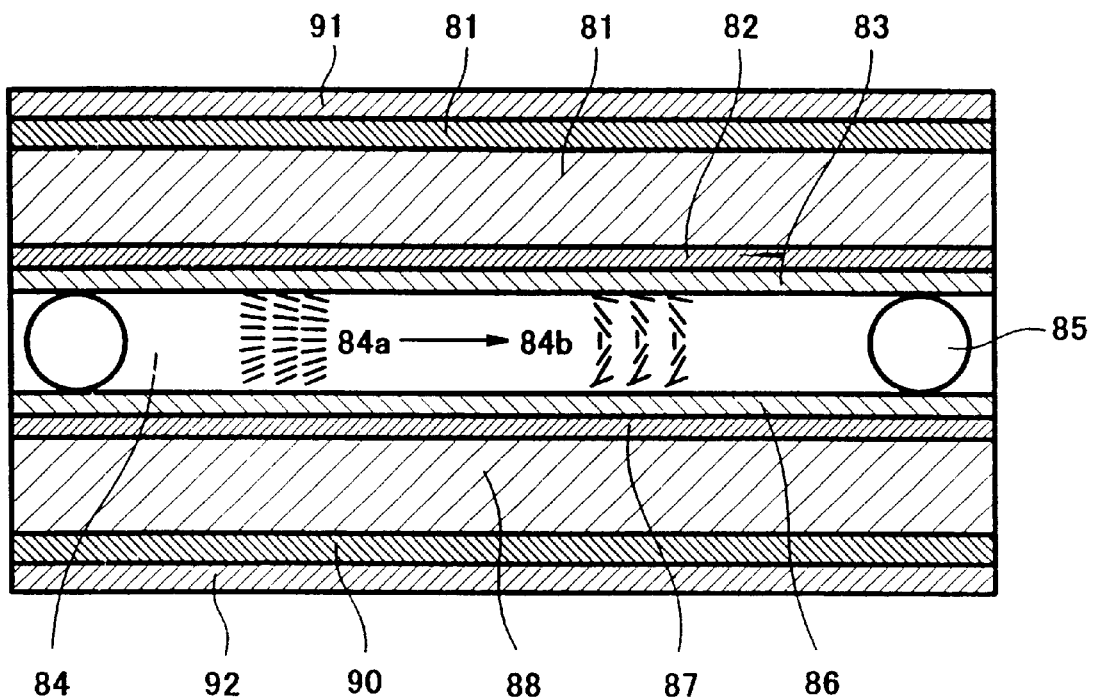
FIG. 36 is a cross-sectional view schematically showing a constitution of the conventional OCB-mode liquid crystal display panel.
Figure 37A:
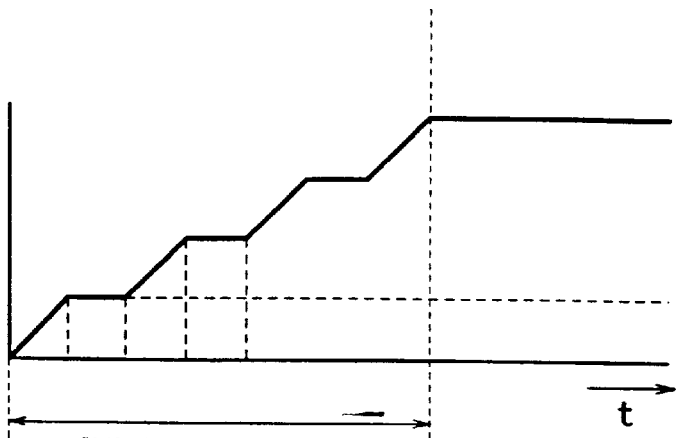
Figure 37B:
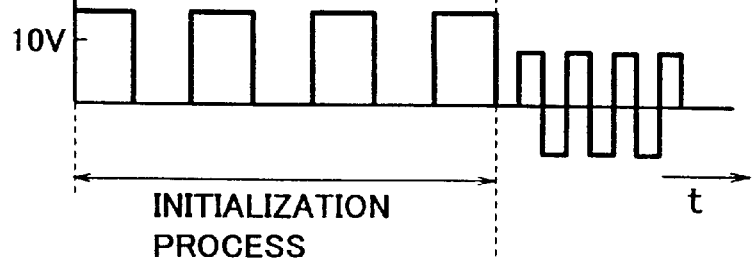
Figure 37C:
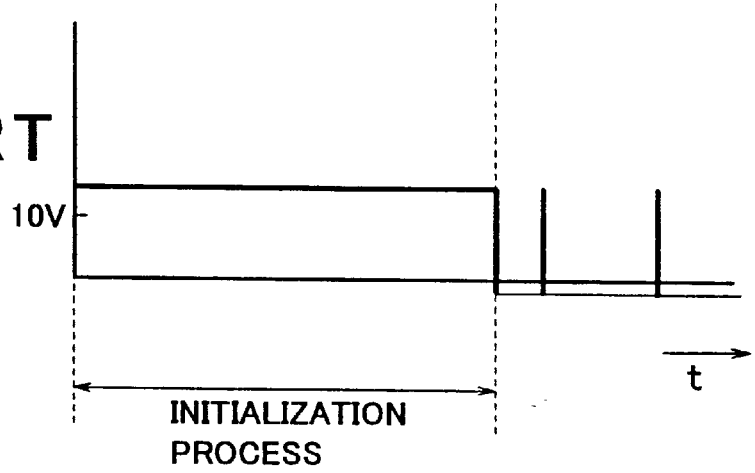

As a further alternative, the transition voltage of the waveforms shown in FIG. 35 may be employed. Similarly to the case of FIG. 9, +15 V voltage as the gate-on potential is sequentially applied to the respective gate lines 12*a*, 12*b*, 12*c* . . . , while −25 V voltage is applied to the counter electrode 2 for one second. During this application, an AC rectangular wave voltage is applied to the source lines 11 at ±7 V and 30 Hz (field frequency) and in the duty ratio of 0.5:1. In that case, since the gate lines 12 are driven in the same manner that an image is normally displayed, the gate driver provided in the general liquid crystal display (e.g., TN-type liquid crystal display) can be used. Therefore, inexpensive constitution is realized.

Similarly to the first embodiment, it is desirable that no voltage is applied across the pixel electrode 6 and the counter electrode 2 just before the transition voltage is applied, in this embodiment.

The liquid crystal displays comprising the OCB-mode liquid crystal display panels have been thus far described. The present invention is not limited to these and may be employed in liquid crystal displays comprising liquid crystal display panels which have a display alignment state and a non-display alignment state which differ from each other and require the initialization for changing the non-display alignment state to the display alignment state before an image is displayed.

As should be appreciated from the forgoing description, the liquid crystal displays of the present invention are capable of obtaining a preferable image display without dot defect. These liquid crystal displays are applicable to various products, including liquid crystal televisions, liquid crystal monitors, liquid crystal displays of portable phones, etc.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A liquid crystal display comprising:
   a pair of opposed substrates;
   a liquid crystal layer disposed between the pair of substrates, the liquid crystal layer having a display alignment state and a non-display alignment state which differ from each other and being subjected to an initialization process so as to be changed from the non-display alignment state to the display alignment state before an image is displayed;
   a first electrode provided on one of the pair of substrates;
   a second electrode provided so as to overlap with the first electrode with an insulator interposed therebetween and disposed between the first electrode and the liquid crystal layer, the second electrode having a lack portion in a region overlapping with the first electrode;
   a counter electrode provided on the other substrate on which the first electrode is not provided; and
   drive means for generating potential difference between the first electrode and the second electrode and between the counter electrode and the second electrode and applying equipotential to the first electrode and the counter electrode to thereby perform the initialization process.

2. The liquid crystal display according to claim 1, wherein one of the pair of substrates is an array substrate having a plurality of pixel electrodes provided in matrix; a plurality of gate lines and source lines arranged so as to cross each other; a plurality of switching devices provided as corresponding to the respective pixel electrodes, for switching between a conductive state and a non-conductive state between the pixel electrodes and the source lines in accordance with a drive signal supplied through the source lines, and
   the other of the pair of substrates is an opposing substrate having a counter electrode opposed to the array substrate.

3. The liquid crystal display according to claim 2, further comprising storage capacitor electrodes overlapping with the pixel electrodes, wherein the first electrode is the storage capacitor electrode and the second electrode is the pixel electrode.

4. The liquid crystal display according to claim 2, wherein the first electrode is the gate line and the second electrode is the pixel electrode.

5. The liquid crystal display according to claim 2, further comprising storage capacitor electrodes overlapping with the pixel electrodes, wherein the first electrode is the storage capacitor electrode and the second electrode is the source line.

6. The liquid crystal display according to claim 2, wherein the first electrode is the gate line and the second electrode is the source line.

7. The liquid crystal display according to claim 2, wherein the first electrode is the pixel electrode and the second electrode is the gate line.

8. The liquid crystal display according to claim 2, further comprising storage capacitor electrodes overlapping with the pixel electrodes, wherein the first electrode is the pixel electrode and the second electrode is the storage capacitor electrode.

9. The liquid crystal display according to claim 2, wherein the first electrode is the source line and the second electrode is the gate line.

10. The liquid crystal display according to claim 2, further comprising storage capacitor electrodes overlapping with the pixel electrodes, wherein the first electrode is the source line and the second electrode is the storage capacitor electrode.

11. The liquid crystal display according to claim 1, wherein the potential difference is 15 V–32 V.

12. The liquid crystal display according to claim 1, further comprising: a third electrode and a fourth electrode provided on one of the pair of substrates on which the first and second electrodes are not provided, so as to overlap each other with an insulator interposed therebetween, wherein:

the third electrode is disposed between the fourth electrode and the liquid crystal layer and has a lack portion in a region overlapping with the fourth electrode, and the drive means is adapted to generate potential difference between the third electrode and the fourth electrode to perform the initialization process.

13. The liquid crystal display according to claim 1, wherein the lack portion is an aperture provided in the second electrode.

14. The liquid crystal display according to claim 13, wherein the aperture includes a plurality of straight-line portions extending toward a position at which these portions cross each other.

15. The liquid crystal display according to claim 13, wherein the aperture is V-shaped.

16. The liquid crystal display according to claim 13, wherein the aperture is W-shaped.

17. The liquid crystal display according to claim 13, wherein the aperture is X-shaped.

18. The liquid crystal display according to claim 13, wherein the aperture is polygon-shaped.

19. The liquid crystal display according to claim 1, wherein the lack portion is shaped to enable application of two-direction electric fields to the liquid crystal layer.

20. The liquid crystal display according to claim 13, wherein the second electrode has an aperture including a portion which is 4 $\mu$m wide or less.

21. The liquid crystal display according to claim 1, wherein the lack portion is a cutout portion provided in the second electrode.

22. The liquid crystal display according to claim 1, wherein the non-display alignment state is spray alignment and the display alignment state is bend alignment.

* * * * *